United States Patent [19]

Kawamura et al.

[11] Patent Number: 5,371,553
[45] Date of Patent: Dec. 6, 1994

[54] MONITOR APPARATUS FOR SELECTING AUDIO-VISUAL UNITS AND OPERATING MODES FROM A CONTROL WINDOW

[75] Inventors: Harumi Kawamura, Tokyo; Kazuyuki Ogawa, Kanagawa, both of Japan

[73] Assignee: Sony Corporation, Tokyo, Japan

[21] Appl. No.: 238,800

[22] Filed: May 6, 1994

Related U.S. Application Data

[63] Continuation of Ser. No. 25,777, Mar. 3, 1993, abandoned.

[30] Foreign Application Priority Data

Mar. 11, 1992 [JP] Japan .................. 4-086659

[51] Int. Cl.$^5$ ............................................. H04N 5/445
[52] U.S. Cl. ................................. 348/734; 348/588
[58] Field of Search .............. 348/588, 589, 725, 734, 348/731; H04N 5/445, 5/45, 5/44

[56] References Cited

U.S. PATENT DOCUMENTS 5,086,385  2/1992  Launey et al. .................. 364/188

FOREIGN PATENT DOCUMENTS 0507314  10/1992  European Pat. Off. ..... H04N 5/445
0208768   9/1987  Japan ........................... H04N 5/445

OTHER PUBLICATIONS

Microsoft Windows 3.1 Step by Step/Catapult Inc. Elman et al. 1992 pp. 6–7.

Primary Examiner—Victor R. Kostak
Assistant Examiner—Nathan J. Flynn
Attorney, Agent, or Firm—Jay H. Maioli

[57] ABSTRACT

A monitor apparatus for an audio-visual system enables a user to select a program to be displayed without being aware of audio-visual units constituting the audio-visual system. A first control window for selecting one of audio-visual units of the audio-visual system and a second control window for designating an operation mode of the selected audio-visual unit are displayed on a screen of a monitor unit. Designations of the audio-visual units are displayed in the first window, and when one of the designations is pointed by a selected device to select a corresponding audio-visual unit, available operation modes of the selected audio-visual unit are displayed in the second window. Then, when one of the operation modes is selected by the pointing device the selected audio-visual unit is put into the selected operation mode. Also an improved control menu displaying apparatus is provided.

4 Claims, 16 Drawing Sheets

MONITOR APPARATUS FOR SELECTING AUDIO-VISUAL UNITS AND OPERATING MODES FROM A CONTROL WINDOW

This is a continuation of application Ser. No. 08/025,777 filed Mar. 3, 1993 now abandoned.

BACKGROUND OF THE INVENTION

1. Field of the Invention

This invention relates to a monitor apparatus for an audio-visual system, and more particularly to a monitor apparatus by which selection of one of displayed programs and selection of an operation mode of an audio-visual unit connected thereto can be performed using a pointing device while the screen is watched. The present invention further relates to a display apparatus by which a controlling menu for selection of a program is displayed on a television receiver or a monitor unit of an audio-visual system.

2. Description of the Related Art

Audio-visual systems generally have such a configuration as shown in FIG. 20. Referring to FIG. 20, the audio-visual system includes an audio-visual monitor unit 171 and three audio-visual units including a video tape recorder (VTR) 173, a laser disk player (LDP) 175 and a video tape recorder 176 integrated with a camera (such video tape recorder will be hereinafter referred to as camcorder). The video tape recorder 173 is connected to a first audio-visual terminal a of the audio-visual monitor unit 171 by way of an audio-visual cable 178; the laser disk player 175 is connected to a second audio-visual terminal b of the monitor unit 171 by way of another audio-visual cable 180; and the camcorder 176 is connected to a third audio-visual terminal c of the monitor unit 171 by way of a further audio-visual cable 181, so that video signals and audio signals of the video tape recorder 173, the laser disk player 175 and the camcorder 176 may be inputted to the monitor unit 171.

In the audio-visual system, when a broadcast of, for example, the sixth channel is to be received by means of a tuner of the video tape recorder 173 and displayed on the audio-visual monitor unit 171, the user will first manually operate a remote control unit (not shown) of the video tape recorder 173 to set the tuner of the video tape recorder 173 to the sixth channel. Then, the user will manually operate a remote control unit (not shown) of the monitor unit 171 to select the first audio-visual input terminal a of the monitor unit 171 while watching the screen of the monitor unit 171.

With the audio-visual system described above, however, since only characters representing the name of a selected one of the audio-visual input terminals a to c of the monitor unit 171 are displayed on the screen of the monitor unit 171 like "Video 1", even if the user watches the screen of the monitor unit 171, the user cannot know the image of which audio-visual unit the screen displays. Accordingly, the user must always be aware which audio-visual units are connected to the individual audio-visual input terminals of the monitor unit 171.

With the conventional audio-visual system, however, selection of an audio-visual unit and selection of a channel are performed separately and are not handled in the same hierarchy. Further, since only characters representing the name of a selected one of the audio-visual input terminals are displayed on the screen of the monitor unit while the names of the audio-visual units connected to the audio-input terminals of the monitor unit are not displayed, the user must always be aware of the audio-visual units connected to the audio-input terminals of the monitor unit. Accordingly, the conventional audio-visual system is not superior in user interface.

A modified audio-visual system is also known and shown in FIG. 21. The audio-visual system shown is different from the audio-visual system shown in FIG. 20 in that it additionally includes an audio-visual (AV) selector 172. An output of the audio-visual selector 172 is connected, for example, to the first audio-visual input terminal a of the monitor unit 171 by way of an audio-visual cable 177. The audio-visual system further includes a tuner 174 as an additional audio-visual unit. The audio-visual units, that is, the video tape recorder 173, the tuner 174, the laser disk player 175 and the camcorder 176, are connected to input terminals of the audio-visual selector 172 by way of audio-visual cables 178, 179, 180 and 181, respectively. One of the audio-visual units 173 to 176 is selected by the audio-visual selector 172, and a video signal and an audio signal of the selected audio-visual unit are inputted to the first audio-visual input terminal a of the monitor unit 171.

In the present audio-visual system, when, for example, a reproduction program of the laser disk player 175 is to be displayed on the monitor unit 171, the audio-visual selector 172 will first be manually operated to set so that the output of the laser disk player 175 may be selected. Then, the remote control unit (not shown) of the monitor unit 171 will be manually operated to select the first audio-visual input terminal a while watching the screen of the monitor unit 171. Then, a remote control unit of the laser disk player 175 will be manually operated to set the laser disk player 175 to a reproduction mode.

With the conventional audio-visual system described above, however, since only characters representing the name of an audio-visual input terminal and an operation mode of the audio-visual unit are displayed on the screen of the monitor unit 171 like "Reproduction of Video 1", even if the user watches the screen of the monitor unit, the user cannot know the image of which audio-visual unit the screen displays. Further, since a remote control unit is provided for each of the audio-visual units which constitute the audio-visual system, the user cannot select a remote control unit unless the user is aware the image of which audio-visual unit the user watches.

In order to solve this problem, audio-visual systems have been developed wherein manually operable keys for controlling a plurality of audio-visual units are disposed on a housing of a single remote control unit or wherein a change-over switch for audio-visual units is provided so that one manually operable key is used commonly for a plurality of audio-visual units. However, since the problem that the audio-visual units cannot be controlled by means of the manually operable keys unless the user is aware the image of which audio-visual unit the user watches at present remains unsolved, the audio-visual system is difficult to use where it involves a large number of audio-visual units.

Meanwhile, various displaying apparatus for displaying a control menu for a television receiver are already known. One of the control menu displaying apparatus is shown in FIG. 22. Referring to FIG. 22, when a power source switch not shown of a television receiver not shown is turned on, a control window 143 is displayed at a left end portion of a screen 141 of the television receiver, and icons 144 to 149 of a control menu for selecting a channel to be received are displayed in the control window 143. If one of the icons 144 to 149 is selected in this condition using a remote control unit or a pointing device such as a mouse not shown, then a program of the selected channel is received and an image is displayed in a major area 142 of the screen 141. During reception of a program, the control window 143 may be erased by manual operation of the remote control unit or the like to expand the area in which the image of the received program is displayed. It is to be noted that a further area 150 below the major area 142 and the control window 143 is used to display therein, for example, a displayed condition of the received channel in the form of a caption. Also the area 150 may be used to display part of the image of the received program therein.

With the conventional control menu displaying apparatus, if the total number of items of programs constituting the menu is comparatively small, then all of them can be displayed in the control window 143. However, when it is tried to select one of a large number of channels, for example, 100 channels or more such as in the case of cable television, they cannot be displayed at a time on the screen 141 at all. In this case, such a measure as to scroll the menu in the control window is necessary. Consequently, although those channels which are enjoyed comparatively frequently by the user of the television receiver are settled to some degree, the menu must be scrolled every time until a desired channel is displayed, and accordingly, much time is required for selection of the menu.

SUMMARY OF THE INVENTION

It is an object of the present invention to provide a monitor apparatus for an audio-visual system which is so superior in user interface that the user can select a program to be displayed without being aware of audio-visual units constituting the audio-visual system.

It is another object of the present invention to provide a monitor apparatus for an audio-visual system by which operation of a selected audio-visual unit can be controlled while the user is not aware an image of which audio-visual unit the user watches at present.

It is a further object of the present invention to provide a control menu displaying apparatus with which a selecting operation of a menu is easy even where the total number of items of a program constituting the menu is great.

In order to attain the objects described above, according to an aspect of the present invention, there is provided a monitor apparatus for an audio-visual system which includes a monitor unit, a plurality of audio-visual units, and audio-visual bus means for transmitting data signals including a command, a video signal and an audio signal between the monitor unit and the audio-visual units, which comprises display means for displaying thereon a first control window for selecting one of the audio-visual units, a second control window for designating an operation mode of the selected audio-visual unit, and for displaying designations of the audio-visual units in the first window, pointing means for pointing a designation displayed in any of the first and second control windows, and controlling means for causing, when one of the designations of the audio-visual units displayed in the first window is pointed by pointing means to select a corresponding one of the audio-visual units, the display means to display available operation modes of the selected audio-visual unit and for putting, when one of the operation modes is pointed by the pointing means to select it, the selected audio-visual unit into the selected operation mode. The pointing means may include a plurality of remote control keys provided on a remote controller for the monitor unit.

With the monitor apparatus for an audio-visual system, if the first control window displayed on the screen of the monitor unit is pointed using the pointing device to select one of the audio-visual units, then the second control window is displayed on the screen of the display unit, and accordingly, if the second control window is pointed using the pointing device, then an operation mode of the audio-visual unit selected in the first control window can be set. Accordingly, control of the entire audio-visual system can be performed by means of the single pointing device while the screen of the monitor unit is watched.

Where the remote control keys are provided on the remote controller for the monitor unit, an operation mode of the audio-visual unit selected using the pointing device can be set by means of any of the remote control keys. Accordingly, the user can control the audio-visual system simply without being aware of a source device under the plain concept that "what is observed can be moved".

The pointing means may include indications of keys displayed in the second window.

According to another aspect of the present invention, there is provided a monitor apparatus for an audio-visual system which includes a monitor unit, a first audio-visual unit having a receiving function, a second audio-visual unit having a reproducing function, and audio-visual bus means for transmitting data signals including a command, a video signal and an audio signal between the monitor unit and the first and second audio-visual units, which comprises display means, control window producing means for producing on the display means a control window in which a channel of a program received by the first audio-visual unit and supplied to the monitor unit and a designation of the second audio-visual unit for reproducing a program supplied to the monitor unit are displayed at a time, pointing means for pointing one of the channel and the designation displayed in the control window, and selecting means for selecting, in response to pointing by the pointing means, a program to be displayed on the display means. The pointing means may include a plurality of remote control keys provided on a remote controller for the monitor unit.

With the monitor apparatus for an audio-visual system, a program to be displayed can be selected by pointing the reception channel or the second audio-visual unit in the control window displayed on the screen of the monitor unit using the pointing device. The selected program is supplied from the first audio-visual unit or the second audio-visual unit to the monitor unit by way of the audio-visual bus means. Thus, since the channel of the program received by the first audio-visual unit and supplied to the monitor unit and the second audio-visual unit which reproduces the program supplied to the monitor unit are displayed at a time, not only one of the audio-visual units which constitute the audio-visual system can be selected but also a channel and a program can be designated directly. Accordingly, the monitor apparatus is enhanced in user interface.

According to a further aspect of the present invention, there is provided a monitor apparatus for an audio-visual system which receives and displays thereon various programs by way of a high speed large capacity digital communication network, which comprises display means, means for producing on the display means a control window in which a menu of the programs is displayed, pointing means for pointing one of the programs in the menu displayed in the control window, and controlling means for selecting the program pointed by the pointing means.

With the monitor apparatus for an audio-visual system, a program to be displayed can be selected by pointing the menu in the control window displayed on the screen of the monitor unit using the pointing device. The selected program is supplied to the monitor unit by way of the high speed large capacity digital communication network. Accordingly, the monitor apparatus is further enhanced in user interface.

According to a still further aspect of the present invention, there is provided a control menu displaying apparatus for displaying a control menu for selecting a program to be displayed on a display unit, which comprises first means for causing the display unit to display thereon a control menu including several items of programs, second means for storing therein access data corresponding to the items, third means for developing an instruction to change the display position of a designated one of the items in the control menu, and fourth means responsive to the instruction from the third means for comparing the access data to the designated item with the access data to the other items and determining, based on a result of the comparison, whether or not the display position of the designated item should be changed.

According to a yet further aspect of the present invention, there is provided a control menu displaying apparatus for an audio-visual system, which includes a monitor unit, a plurality of audio-visual units, and audio-visual bus means for transmitting a command, a video signal and an audio signal between the monitor unit and the audio-visual units, for displaying a menu of programs supplied from the audio-visual units on the monitor unit, which comprises first means for causing the monitor unit to display thereon a control menu including several items of programs, second means for storing therein access data to the items, third means for developing an instruction to change the display position of a designated one of the items in the control menu, and fourth means responsive to the instruction from the third means for comparing the access data to the designated item with the access data to the other items and determining, based on a result of the comparison, whether or not the display position of the designated item should be changed.

With both of the control menu displaying apparatus, the display position of an arbitrary item in the menu can be changed in accordance with the accessing condition of the user. Consequently, the items in the menu can be displayed in order, for example, beginning with an item which is selected most frequently. Accordingly, those items which are accessed comparatively frequently will all be displayed at a time on the screen, and one of them can be selected without the necessity of manual operation for scrolling or the like. Consequently, the environment in which "a program enjoyed frequently can be selected immediately" is provided. Further, if a relationship between the frequency of access and time is taken and the display position of an item of the menu is determined forecasting a future frequency of access to the item, then a display of a menu which is further easy to use can be provided.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 5:
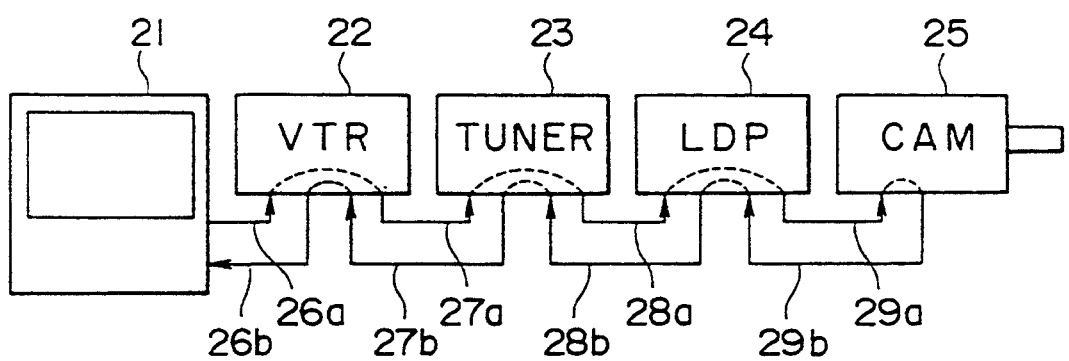
FIG. 5 is a block diagram showing general construction of an audio-visual system to which the monitor apparatus of the present invention is incorporated.

Referring first to FIG. 5, there is shown an audio-visual system in which a monitor apparatus according to the present invention is incorporated. The audio-visual system shown includes an audio-visual monitor unit 21 with an audio-visual controlling function, which is connected to a video tape recorder (VTR) 22 via audio-visual buses 26a and 26b, further to a tuner (TUNER) 23 via audio-visual buses 27a and 27b, further to a laser disk player (LDP) 24 via audio-visual buses 28a and 28b and further to a camcorder (CAM) 25 via audio-visual buses 29a and 29b, thereby constituting a ring-like network. In particular, data outputted, for example, from the audio-visual monitor unit 21 come to the video tape recorder 22 through the audio-visual bus 26a, to the tuner 23 further through the audio-visual bus 27a, to the laser disk player 24 further through the audio-visual bus 28a and to the camcorder 25 further through the audio-visual bus 29a. Then, the data come to the laser disk player 24 further through the audio-visual bus 29b, to the tuner 23 further through the audio-visual bus 28b, to the video tape recorder 22 further through the audio-visual bus 27b, and back to the audio-visual monitor unit 21 further through the audio-visual bus 26b.

The audio-visual buses 26a and 26b are accommodated in a single cable and constituted, for example, from optical fibers and have the transmission rate of 100 Mbits/sec. The audio-visual buses 27a and 27b, 28a and 28b, and 29a and 29b are constructed similarly to the audio-visual buses 26a and 26b.

Figure 6:
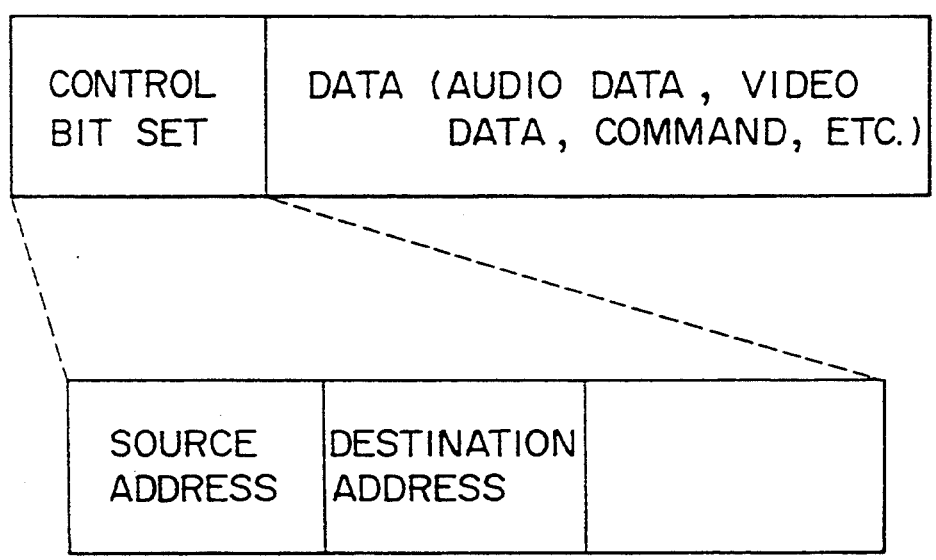
FIG. 6 is a diagrammatic view showing the construction of an essential part of a signal passing through audio-visual buses of the audio-visual system shown in FIG. 5.

Referring now to FIG. 6, the format of an essential part of a signal which passes through the audio-visual buses in the audio-visual system is shown. The signal format shown has the form of a packet including a control bit set and data (audio data, video data, a command and so forth).

The control bit set includes a source address indicative of an audio-visual unit which has sent out the data, a destination address indicative of an audio-visual unit of the destination of the data, and so forth.

The data in the signal format include a command for controlling an audio-visual unit such as the video tape recorder 22 or the tuner 23, an audio signal and/or a video signal sent out from the video tape recorder 22 or the tuner 23 to the audio-visual monitor unit 21, and so forth, and have a length in accordance with contents of the data.

Figure 7:
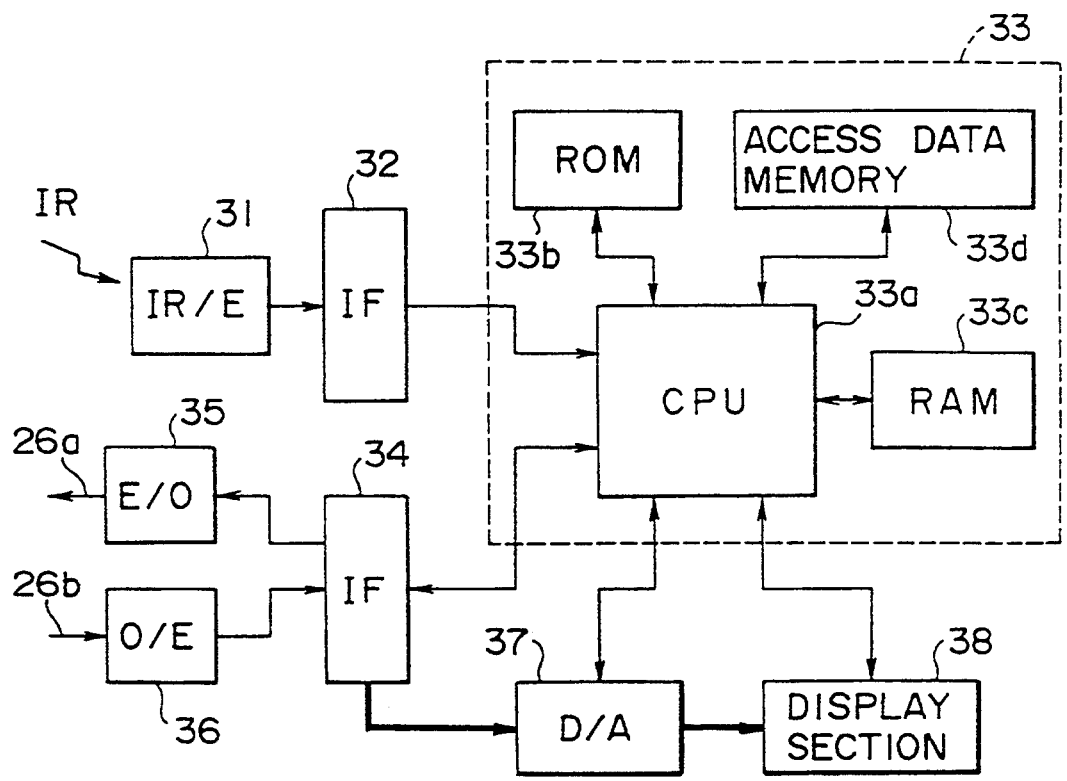
FIG. 7 is a block diagram showing the construction of an audio-visual monitor unit of the monitor apparatus.

Referring now to FIG. 7, the audio-visual monitor unit incorporated in the audio-visual system described hereinabove with reference to FIG. 5 is shown in block diagram. In FIG. 7, transmission lines only for a video signal and an audio signal are each indicated by a thick line.

The audio-visual monitor unit shown includes an infrared-ray to electricity converter (IR/E) 31 which converts a command sent out as infrared-rays (IR) from a remote controlling and pointing device (which will be hereinafter described in detail) into an electric signal, and an interface (IF) 32 which transfers the electric signal to a control section 33. The control section 33 analyzes the command and sends it out to a display section 38. Further, the control section 33 adds, in accordance with contents of the command thus analyzed, a source address and a destination address to the data on which the command for controlling an audio-visual unit is carried, and sends out the resulting signal into the audio-visual bus 26a by way of an interface (IF) 34 and an electro-optic converter (E/O) 35. The control section 33 includes a CPU (central processing unit) 33a which analyzes a command inputted thereto and detects a program of which channel has been accessed. The CPU 33a stores a result of the detection into an access data memory 33d constituted from an EEPROM (electrically erasable programmable read only memory). The CPU 33a further executes necessary processing, which will be hereinafter described, in accordance with a control procedure or program stored in a ROM (read only memory) 33b. The control section 33 further includes a RAM (random access memory) 33c. A photoelectric converter 36 converts an optical signal inputted thereto from the audio-visual bus 26b into an electric signal and transfers it to the control section 33 by way of the interface 34. In case the data are a video signal or an audio signal sent out from an audio-visual unit, they are converted into an analog signal by a digital to analog converter (D/A) 37 and supplied to the display section 38. The display section 38 has an image display section and a sound display section, receives a video signal and an audio signal and displays them as an image and sound.

Figure 8:
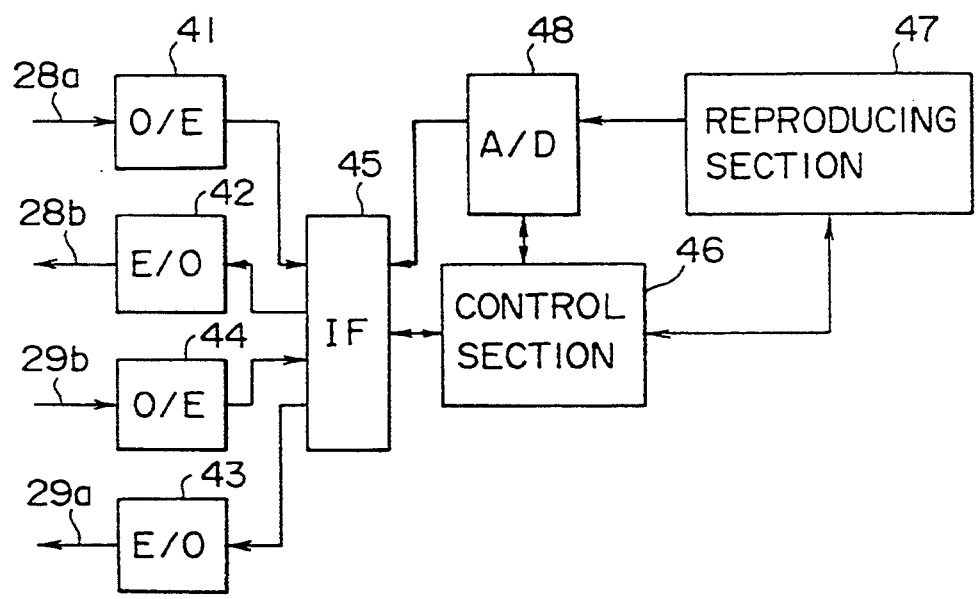
FIG. 8 is a block diagram showing the general construction of a laser disk player constituting the audio-visual system shown in FIG. 5.

FIG. 8 shows the construction of the laser disk player 24 of the audio-visual system described above. Also in FIG. 8, transmission lines only for a video signal and an audio signal are each indicated by a thick line similarly as in FIG. 7.

The laser disk player 24 include a photoelectric converter (O/E) 41 which converts an optical signal inputted thereto through the audio-visual bus 28a into an electric signal, and an interface (IF) 45 which transfers the electric signal to a control section 46 which may be constituted from a microcomputer. The control section 46 fetches data inputted thereto by way of the interface 45 if the destination address added to the data is for the control section 46 itself, but if the destination address is not for the control section 46 itself, the control section 46 does not fetch the data. Data which have not been fetched by the control section 46 are converted into an optical signal by an electro-optic converter (E/O) 43 and are sent out into the audio-visual bus 29a. A reproducing section 47 reproduces a program from a laser disk based on the command analyzed by the control section 46. An analog to digital converter (A/D) 48 converts a video signal and an audio signal outputted from the reproducing section 47 into digital signals and sends them out to the interface 45.

It is to be noted that the connection configurations of the video tape recorder 22, the tuner 23 and the camcorder 25 to the audio-visual buses are similar to those of the laser disk player 24 described above, and overlapping description thereof is omitted herein to avoid redundancy.

Figure 9:
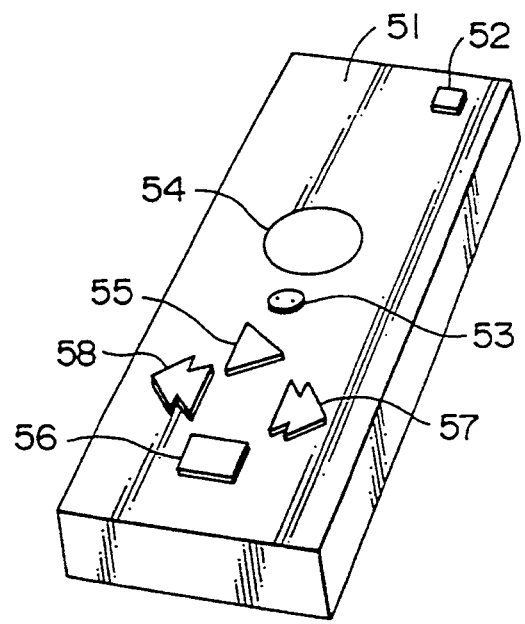
FIG. 9 is a schematic perspective view of the remote controlling and pointing device.
Figure 10:
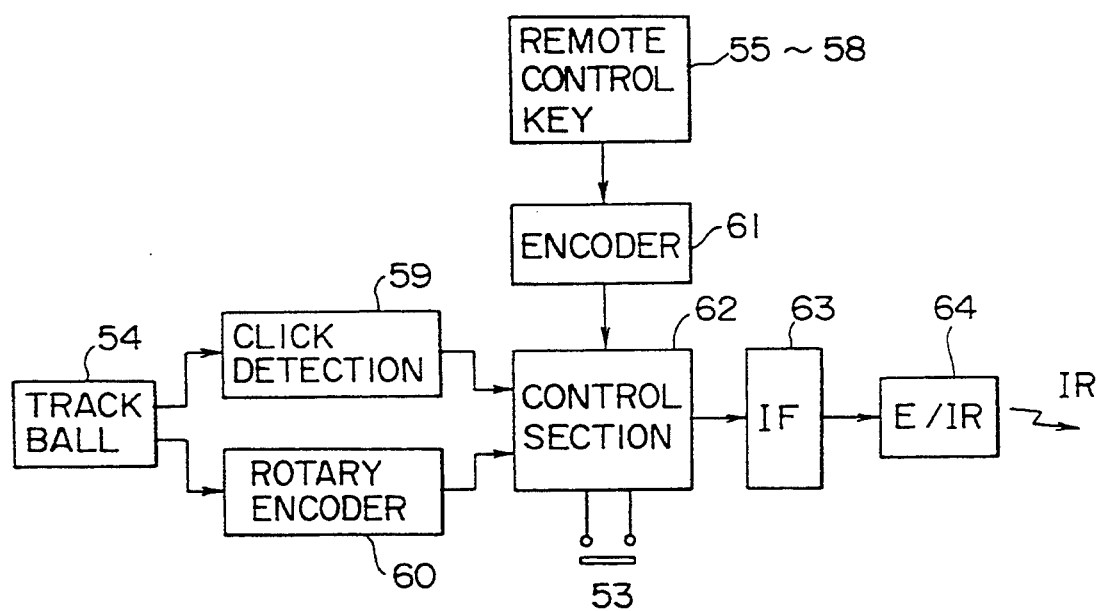
FIG. 10 is a block diagram of the remote controlling and pointing device.

Referring now to FIGS. 9 and 10, the remote controlling and pointing device mentioned hereinabove is shown in detail. The remote controlling and pointing device includes a remote controlling and pointing device housing 51 and several manually operable elements provided on the housing 51. Referring first to FIG. 9, the manually operable elements include a power source on/off switch 52 for the entire audio-visual system, a menu on/off switch 53 for setting the audio-visual monitor unit 21 of FIG. 5 to a condition wherein it displays a menu thereon, a click button/track ball 54, and remote control keys 55 to 58 for manually operating an audio-visual unit selected by the remote controlling and pointing device.

Referring to FIG. 10, several electric elements are provided in the inside of the remote controlling and pointing device housing 51, including a click detecting section 59 for detecting a click of the click button/track ball 54 and outputting it to a control section 62, a rotary encoder 60 for detecting rotation of the click button/track ball 54 and outputting it to the control section 62, and an encoder 61 for detecting a manual operation of any of the remote control keys 55 to 58 and outputting it to the control section 62. The control section 62 receives a command of any of the remote control keys 55 to 58 inputted thereto by way of the encoder 61, a manual click operation inputted by way of the click detecting section 59 and rotation of the click button/track ball 54 inputted thereto by way of the rotary encoder 60 and outputs a command to an electricity to infrared-ray converter (E/IR) 64 by way of an interface (IF) 63 such as a driver circuit. The command is outputted from the electricity to infrared-ray converter 64 to the audio-visual monitor unit 21 shown FIG. 5. It is to be noted that the power source on/off switch 52 for the entire system is omitted from FIG. 10.

The monitor apparatus incorporated in the audio-visual system described above operates in the following manner. It is to be noted that operation of the monitor apparatus when the user wants to reproduce and display a program of the laser disk player 24 on the audio-visual monitor unit 21 will be described below by way of example.

Referring to FIGS. 2 and 5 to 10, first, the user will turn on the power source on/off switch 52 of the remote controlling and pointing device. The control section 62 of the remote controlling and pointing device thus produces a command to turn on the power source of the audio-visual monitor unit 21, and the command is transmitted as an optical signal of infrared-rays from the electricity to infrared-ray converter 64 of the remote controlling and pointing device to the audio-visual monitor unit 21. In response to the optical signal, the control section 33 of the audio-visual monitor 21 first analyzes the command inputted thereto by way of the infrared-ray to electricity converter 31 and the interface 32 and performs initialization thereof including confirmation of connecting conditions of audio-visual units connected to the audio-visual buses, detection of an abnormal condition, and so forth (step S1 in FIG. 2).

Figure 1:
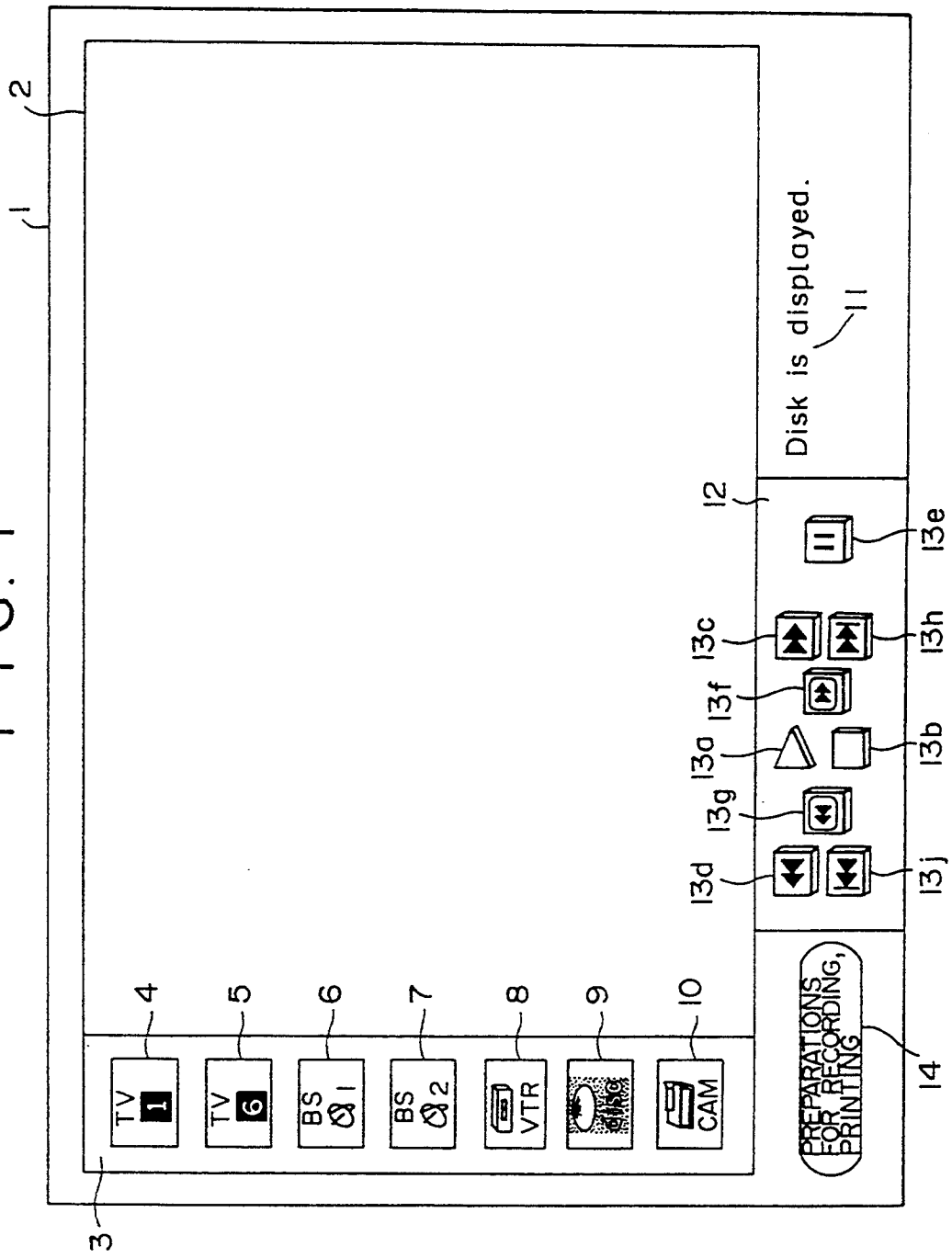
FIG. 1 is a diagrammatic view showing a display screen upon manual operation of a remote controlling and pointing device of a monitor apparatus according to a first preferred embodiment of the present invention.
Figure 2:
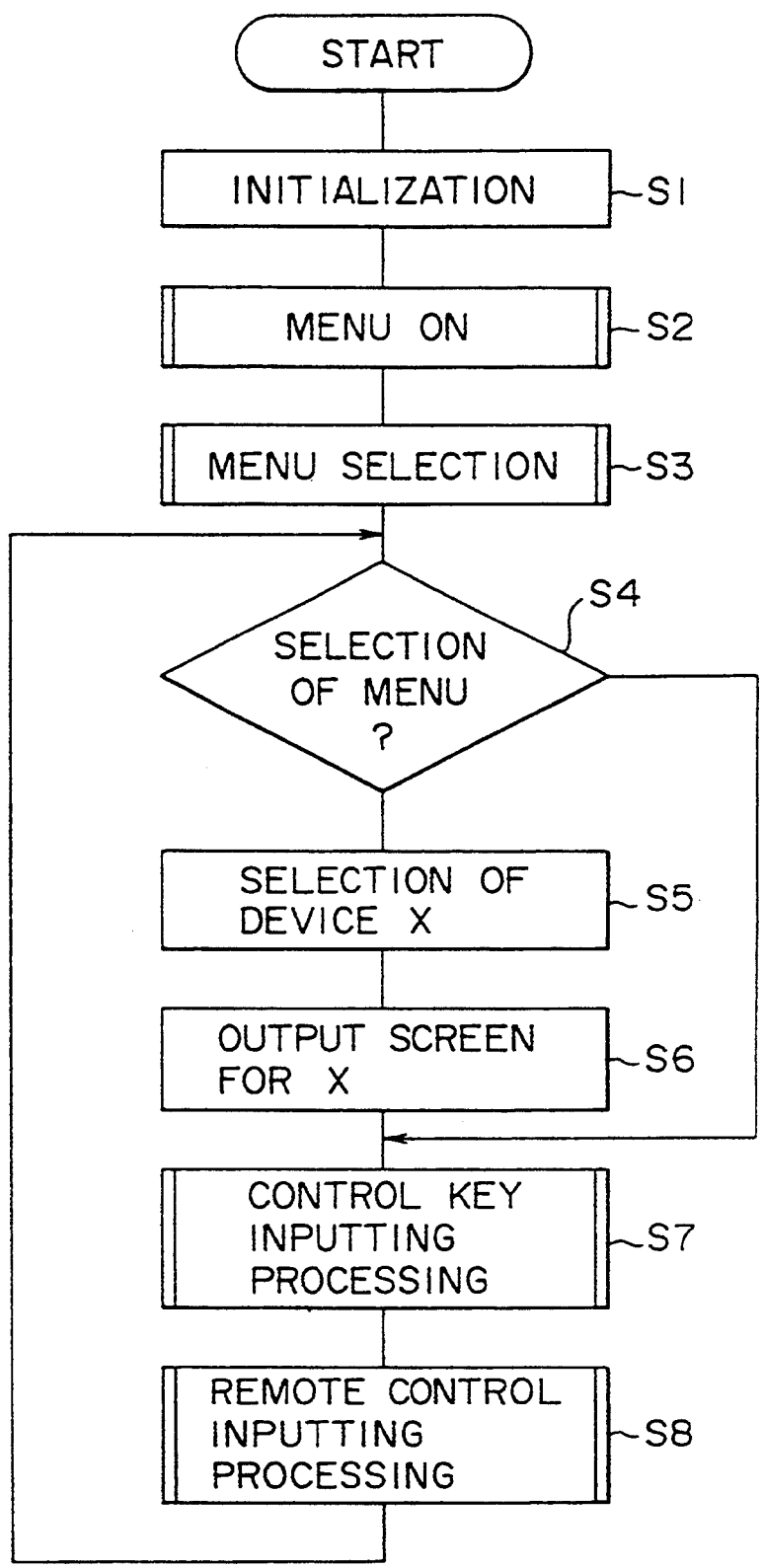
FIG. 2 is a flow chart illustrating operation of the monitor apparatus upon manual operation of the remote controlling and pointing device.

Then, the user will turn on the menu on/off switch 53 of the remote controlling and pointing device (step S2). Referring also to FIG. 1, in response to the manual operation, the control section 33 of the audio-visual monitor unit 21 causes the display section 38 to display a first control window 3 on the left side of a major area 2 on a display screen 1 of the display section 38 and simultaneously causes the display section 38 to display icons 4 to 7 indicating receiving channels and icons 8 to 10 indicating the audio-visual units in the first control window 3. The control section 33 further causes the display section 38 to display a cursor (not shown) in the first control window 3. Here, the icon 4 indicates reception of the first channel, the icon 5 indicates reception of the sixth channel, the icon 6 indicates reception of the first program of broadcasting via satellite, and the icon 7 indicates reception of the second program of broadcasting via satellite. Meanwhile, the icon 8 indicates reproduction of a program of the video tape recorder 22, the icon 9 indicates reproduction of a program of the laser disk player 24, and the icon 10 indicates reproduction of a program of the camcorder 25. Accordingly, when the user wants to enjoy the broadcasting of the first channel, the user should manually operate the click button/track ball 54 of the remote controlling and pointing device to move the cursor to the icon 4 and click it, but when the user wants to reproduce a program of the laser disk player 24, the user should similarly move the cursor to the icon 9 and click the click button/track ball 54.

As reception programs to be displayed on the icons 4 to 7, programs which are enjoyed comparatively frequently are set in advance by manual operation of the audio-visual monitor unit or the remote controlling device and pointing device. A particular program (such as a news at seven o'clock) may be set. Meanwhile, audio-visual units (here, the video tape recorder 22, the laser disk player 24 and the camcorder 25) to be displayed on the icons 8 to 10 are automatically set at step S2 at which communications of data are performed between the audio-visual monitor unit 21 and the audio-visual units. Accordingly, the user need not be aware of the audio-visual units constituting the audio-visual system different from the conventional audio-visual system. It is to be noted that patterns of the icons may be stored in the ROM 33b not shown of the control section 33 of the audio-visual monitor unit 21 or may be transmitted from audio-visual units indicated by the icons by way of the audio-visual buses.

Subsequently, the user will manually operate the click button/track ball 54 of the remote controlling and pointing device to select the icon 9 and click it (step S3). In this instance, when the control section 33 of the audio-visual monitor unit 21 confirms that the laser disk player 24 has been selected (steps S4 and S5), it causes the color of the background of the icon 9 to be changed to indicate that the laser disk player 24 has been selected and causes a second control window 12 to be displayed below the major area 2 of the screen 1 and further causes control keys 13a to 13j for setting an operation mode of the laser disk player 24 to be displayed in the second control window 12 as seen in FIG. 1 (step S6).

Figure 3:
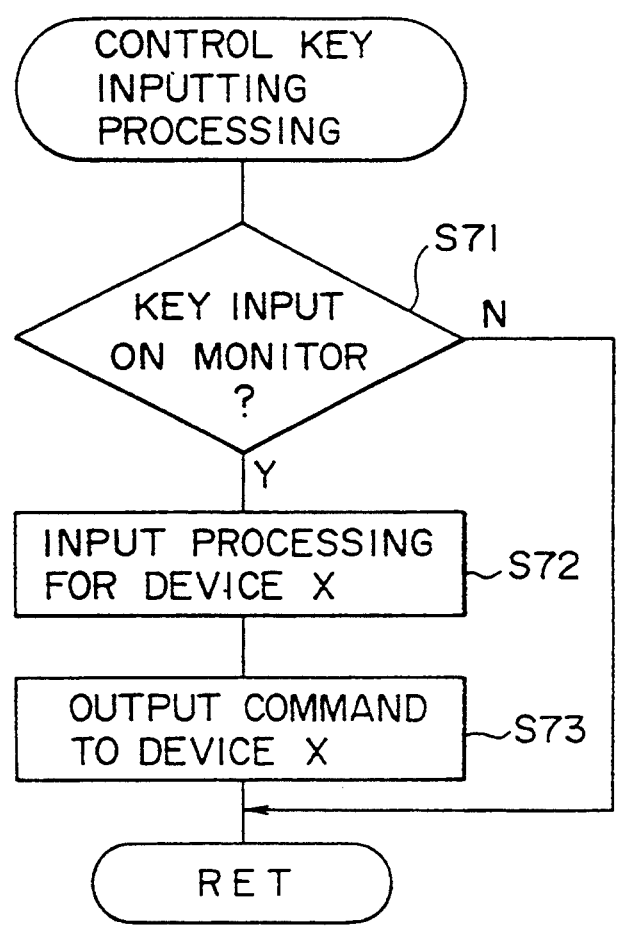
FIG. 3 is a flow chart illustrating operation of the control key inputting processing in the operation illustrated in FIG. 2.
Figure 4:
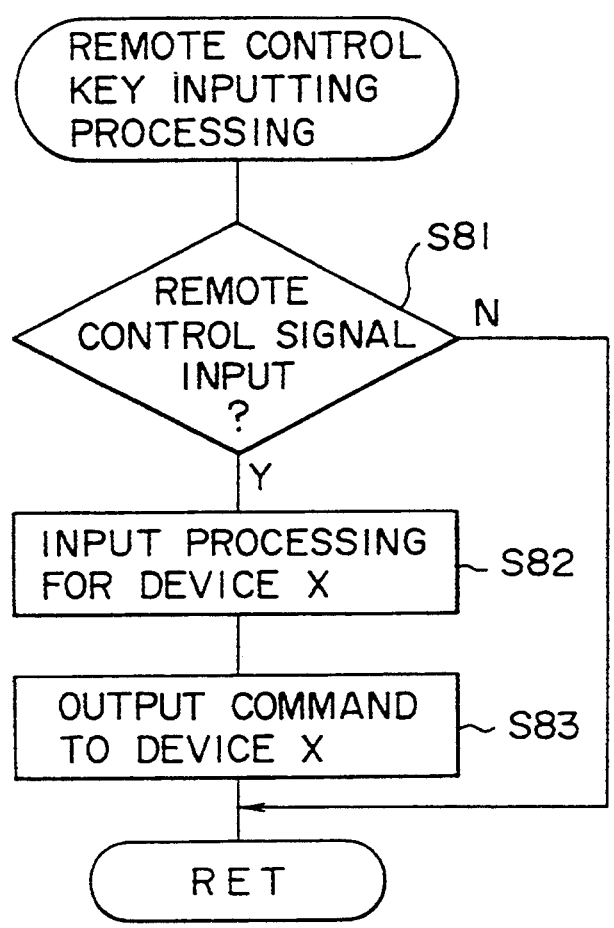
FIG. 4 is a flow chart illustrating operation of the remote control inputting processing in the operation illustrated in FIG. 2.

Then, the user will set the laser disk player 24 to a reproduction mode. Such setting may be achieved by manually operating the click button/track ball 54 to move the cursor to the PB control key 13a displayed at a lower portion of the second control window of the screen 1 and clicking it or by manually operating the PB remote control key 55 provided on the remote controlling and pointing device. The processing when the former manual operation is performed is executed at step S7, and the processing when the latter manual operation is performed is executed at step S8, and details of them are illustrated in FIGS. 3 and 4, respectively. In the following, a flow of operations of the processing when the former manual operation is performed will be described.

Referring to FIG. 4, first, when the cursor is moved to the PB control key 13a displayed on the audio-visual monitor unit 21 and the click button/track ball 54 is clicked, the control section 33 of the audio-visual visual monitor unit 21 judges whether or not the PB control key 13a displayed on the display section 38 has been operated (step S71). Then, if the judgment is YES, the control section 33 of the audio-visual monitor unit 21 confirms an audio-visual unit selected at present and recognizes that a control signal should be directed to the audio-visual unit, and here, the control section 33 processes determining that an instruction to reproduce the laser disk player 24 has been provided (step S72). Then, the control section 33 produces a command to set the laser disk player 24 to a reproduction mode, adds a control bit set indicating that the source address indicates the audio-visual monitor unit 21 and the destination address indicates the laser disk player 24, and sends out the resulted signal to the audio-visual bus 26a by way of the interface 34 and the electro-optical converter 35 (step S73), thereby completing the control key inputting processing.

The control section 46 of the laser disk player 24 fetches, checking the destination address added to the data inputted thereto by way of the audio-visual bus 28a and the interface 45, the data and analyzes the command. Then, the control section 46 sets the reproducing section 47 to a reproduction mode to effect reproduction of a program. Further, the control section 46 adds, to a video signal and an audio signal outputted from the reproducing section 47 and converted into digital signals by the analog to digital converter 48, a control bit set which represents that the source address indicates the laser disk player 24 and the destination address indicates the audio-visual monitor unit 21, and sends out the resulted signal to the audio-visual bus 29a by way of the interface 45 and the electro-optical converter 43. The data sent out into the audio-visual bus 29a come to the audio-visual monitor unit 21 by way of the camcorder 25, the audio-visual bus 29b, the laser disk player 24, the audio-visual bus 28b, the tuner 23, the audio-visual bus 27b, the video tape recorder 22 and the audio-visual bus 26b.

The control section 33 of the audio-visual monitor unit 21 fetches, checking the destination address added to the data inputted thereto from the audio-visual bus 26b, the data. The digital to analog converter 37 converts the data inputted thereto into an analog video signal and an analog audio signal and outputs them to the display section 38. The reproduction program of the laser disk player 24 is displayed in the major area 2 of the screen 1, and a message 11 "Disk is displayed." is displayed below the area 2 on the right side of the second control window 12. Further, another message 14 indicating "Preparations for recording and printing" is displayed on the left side of the second control window 12 (preparations for printing are made when a printer is connected to the audio-visual buses).

The reproduction mode setting operation of the laser disk player 24 is completed with this. Since the various control keys (the stop control key 13b, the fast feeding (FF) control key 13c, the rewinding (REW) control key 13d, the pause control key 13e, the high speed search control key 13f, the reverse high speed search control key 13g, the chapter control key 13h and the reverse chapter control key 13j) for controlling the laser disk player 24 are displayed on the screen 1 of the audio-visual monitor unit 21, the laser disk player 24 can be set to any operation mode by moving the cursor and clicking the click button/track ball 54. While here the description of the case wherein a reproduction program of the laser disk player 24 is displayed on the audio-visual monitor unit 21 has been given, when, for example, the video tape recorder 22 is selected, various control keys for instruction of operation modes of the video tape recorder 22 are displayed similarly.

It is to be noted that, when the user wants to record a program being reproduced, if the cursor is moved to the position of the word of "Recording" of the message 14 and the click button/track ball 54 is clicked, then a message to select a video unit for recording is displayed, and accordingly, if the cursor is moved to the icon 8 and the click button/track ball 54 is clicked, then recording is performed by the video tape recorder 22. This similarly applies to the case of printing. Further, although the first control window 3, the second control window 12, and the messages 11 and 14 may continue to be displayed during reproduction of the program, if the menu on/off switch 53 of the remote controlling and pointing device is turned off to erase them, then the reproduction program can be displayed over the entire screen 1.

Since the flow of operations when the PB remote control key 55 provided on the remote controlling and pointing device is manually operated is similar to that of the case of FIG. 3, detailed description thereof is omitted herein. In this instance, since the four kinds of remote control keys including the PB remote control key 55, the stop remote control key 56, the fast feeding remote control key 57 and the rewinding remote control key 58 are provided on the remote controlling and pointing device, it is possible to set any of those operation modes. Further, a signal generated by the encoder 61 when it detects a manual operation of any of the remote control keys 55 to 58 only designates an operation mode but does not designate an audio-visual unit.

As described so far, in the present embodiment, if the user moves the cursor to any of the icons 4 to 10 displayed on the screen 1 of the audio-visual monitor unit 21 and clicks the click button/track ball 54 to select an audio-visual unit, then it is thereafter possible to set an operation mode without being aware of the selected audio-visual unit.

Subsequently, a monitor apparatus for an audio-visual system according to a second preferred embodiment of the present invention will be described. Also the monitor apparatus of the present embodiment is incorporated in the audio-visual system shown in FIG. 5 and has such hardware construction as shown in FIG. 7 similarly as in the first embodiment described hereinabove, and overlapping description of them is omitted herein to avoid redundancy. The monitor apparatus of the present embodiment is different from the monitor apparatus of the preceding embodiment only in that the control program stored in the ROM 33b of the control section 33 of the audio-visual monitor unit 21 is different and accordingly the monitor apparatus of the present embodiment operates in a different manner. Thus, operation of the monitor apparatus of the present embodiment will be described subsequently with reference to FIGS. 5 to 7 and 11 to 14. In particular, operation of the monitor apparatus when the user wants to display a control menu of the tuner 23 on the audio-visual monitor unit 21 will be described below by way of example.

Figure 14:
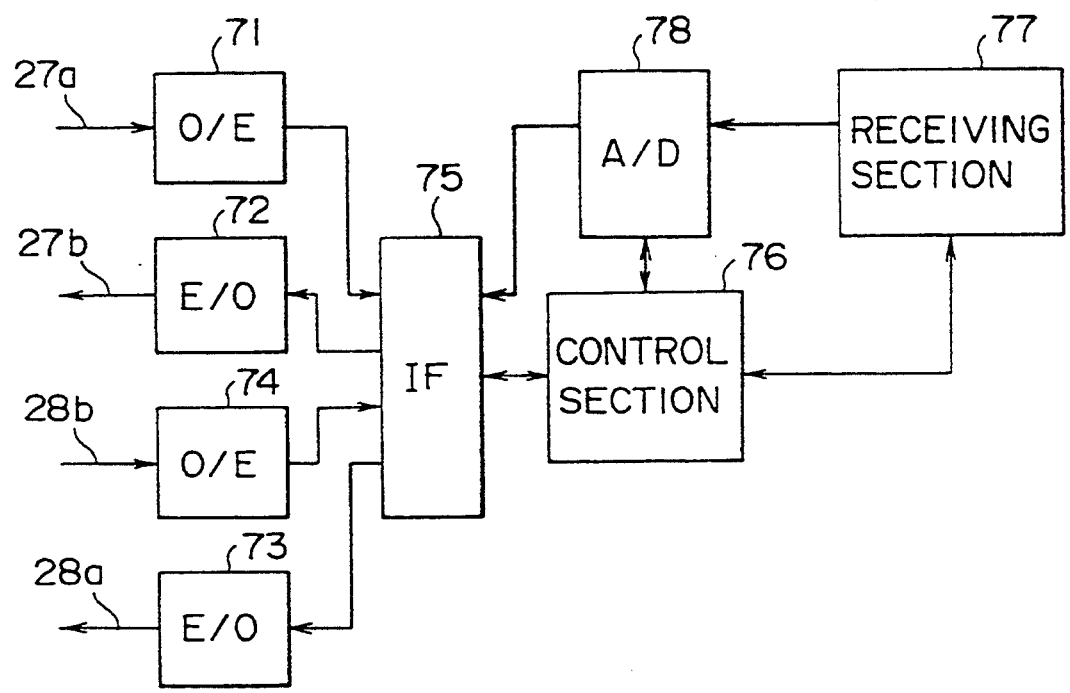
FIG. 14 is a block diagram showing general construction of a tuner constituting the audio-visual system shown in FIG. 5.

Referring first to FIGS. 5, 7 and 14, the construction of the tuner 23 of the audio-visual system is shown. Also in FIG. 14, transmission lines only for a video signal and an audio signal are each indicated by a thick line similarly as in FIGS. 7 and 8.

The tuner 23 includes a photoelectric converter (O/E) 71 which converts an optical signal inputted thereto through the audio-visual bus 27a into an electric signal, and an interface (IF) 75 which transfers the electric signal to a control section 76 which may be constituted from a microcomputer. The control section 76 fetches data inputted thereto by way of the interface 75 if the destination address added to the data is for the control section 76 itself, but if the destination address is not for the control section 76 itself, the control section 76 does not fetch the data. Data which have not been fetched by the control section 76 are converted into an optical signal by an electro-optic converter (E/O) 73 and are sent out into the audio-visual bus 28a. A receiving section 77 reproduces a program selected in accordance with the command analyzed by the control section 76. An analog to digital converter (A/D) 78 converts a video signal and an audio signal outputted from the reproducing section 77 into digital signals and sends them out to the interface 75.

Figure 11:
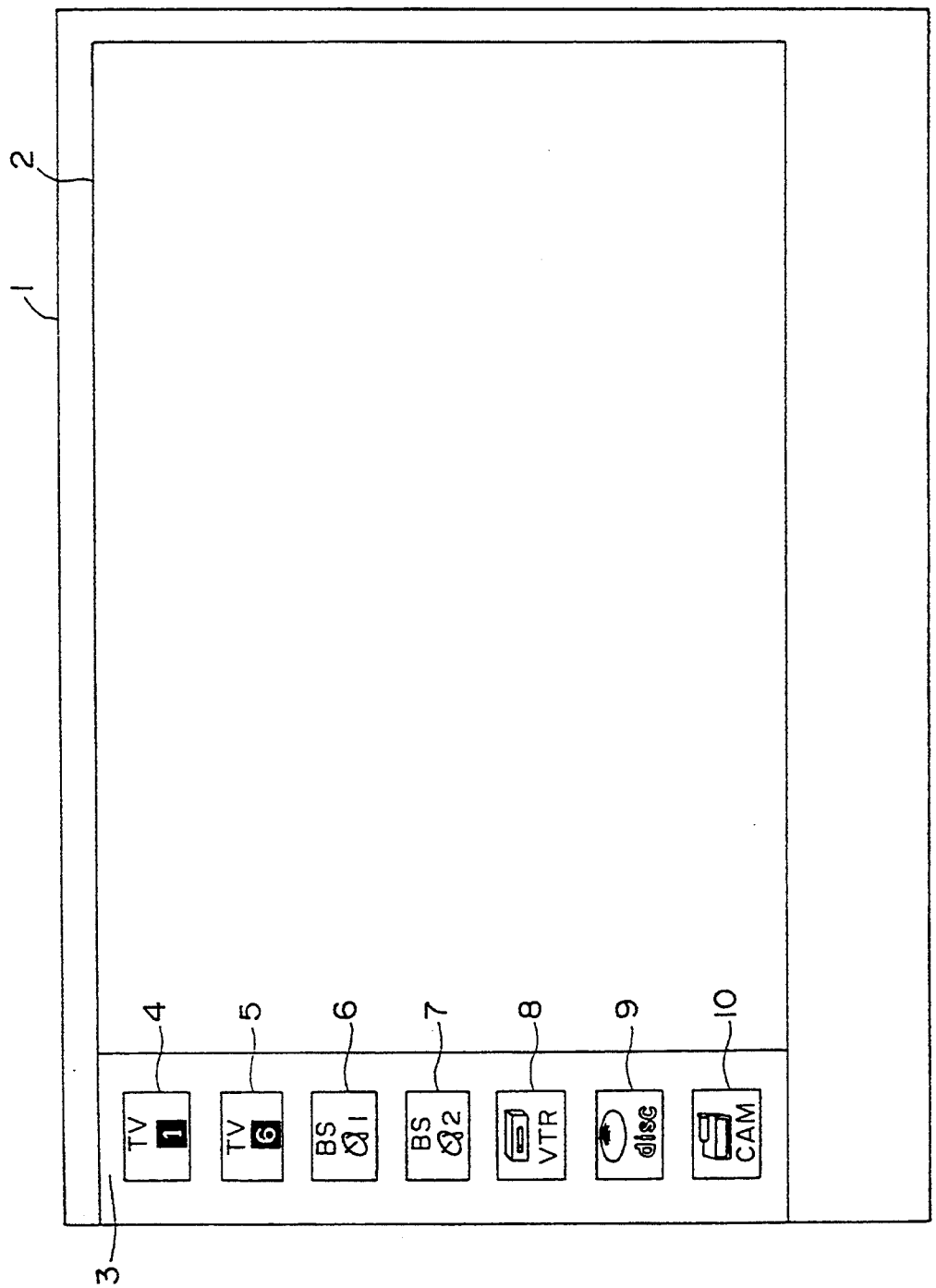
FIG. 11 is a diagrammatic view showing the display screen displayed with a monitor apparatus according to a second preferred embodiment of the present invention.

In operation, referring to FIGS. 5 to 7 and 11 to 14, after the user turns on the power source on/off switch 52 of the remote controlling and pointing device, the user will manually turn on the menu on/off switch 53 of the remote controlling and pointing device in order to display a control menu on the display section 38 of the audio-visual monitor unit 21. Consequently, the control section 33 of the audio-visual monitor unit 21 causes the display section 38 to display a first control window 3 on the display screen 1 of the display section 38 and simultaneously causes the display section 38 to display icons 4 to 7 indicating receiving channels and icons 8 to 10 indicating the audio-visual units in the first control window 3 as seen in FIG. 11, in a similar manner as shown in FIG. 1. Here, the icons 4 to 10 are similar to those shown in FIG. 1 except the icon 7, which indicates the second program of broadcasting via satellite received by means of the tuner 13.

Subsequently, the user will manually operate the click button/track ball 54 of the remote controlling and pointing device to select the icon 4 and click it. The control section 33 of the audio-visual monitor unit 21 thus analyzes the command inputted thereto by way of the infrared-ray to electricity converter 31 and the interface 32. Then, the control section 33 produces a command to set the receiving section 77 of the tuner 23 to the sixth channel and forward a signal of the received sixth channel to the audio-visual monitor unit 21, adds to the command a control bit set which represents that the source address indicates the audio-visual monitor unit 21 and the destination address indicates the tuner 23, and sends out the resulted signal into the audio-visual bus 26a by way of the interface 34 and the electro-optic converter 35.

The control section 76 of the tuner 23 fetches, checking the destination address added to the data inputted thereto by way of the audio-visual bus 27a and the interface 75, the data and analyzes the command. Then, the control section 76 sets the reproducing section 77 to the sixth channel to effect reception of the broadcasting. Further, the control section 76 adds, to a video signal and an audio signal received by the reproducing section 77 and converted into digital signals by the analog to digital converter 78, a control bit set which represents that the source address indicates the tuner 23 and the destination address indicates the audio-visual monitor unit 21, and sends out the resulting signal to the audio-visual bus 28a by way of the interface 75 and the electro-optical converter 73. The data sent out into the audio-visual bus 28a come to the audio-visual monitor unit 21 by way of the laser disk player 24, the audio-visual bus 29a, the camcorder 25, the audio-visual bus 29b, the laser disk player 24, the audio-visual bus 28b, the tuner 23, the audio-visual bus 27b, the video tape recorder 22 and the audio-visual bus 26b.

The control section 33 of the audio-visual monitor unit 21 fetches the data, checking the destination address added to the data inputted thereto from the audio-visual bus 26b. The digital to analog converter 37 converts the data inputted thereto into analog signals and outputs them to the display section 38. Consequently, the image of the sixth channel is displayed in the major area 2 of the screen 1. In this instance, while the display in the control window 3 may continue to be displayed, if the menu on/off switch 53 of the remote controlling and pointing device is turned off to erase it, then the area in which the image of the sixth channel is displayed can be increased. It is to be noted that the area below the area 2 and the control window 3 is used to display, for example, a displayed condition of the received channel in a caption. The image of the program received may be displayed also in this area.

The selecting operation of the sixth channel is completed with this. Subsequently, an operation of changing the display position of a control menu will be described.

Figure 12:
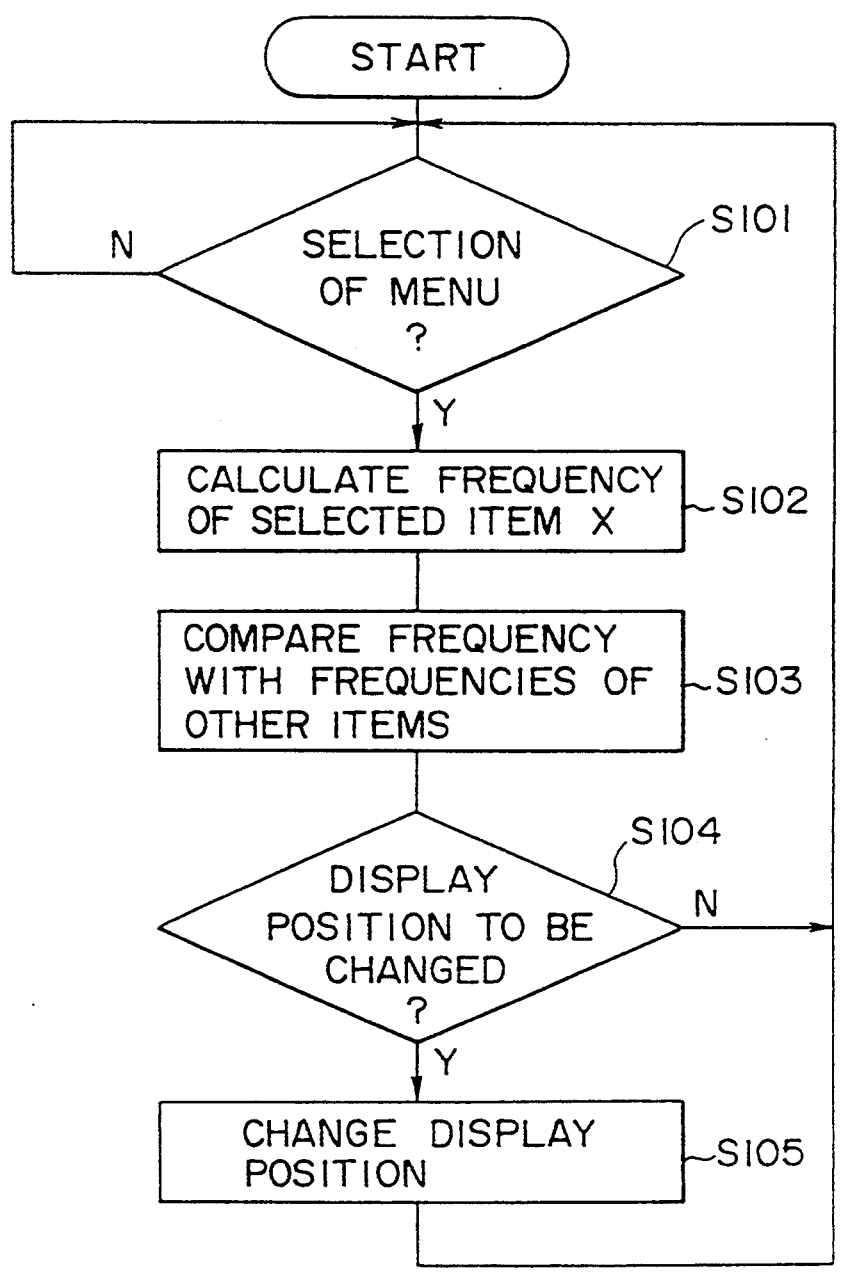
FIG. 12 is a flow chart illustrating operation of the monitor apparatus of the second embodiment upon manual operation of the remote controlling and pointing device.

If the user manually operates the remote controlling and pointing device to select, for example, the icon 4 displayed in the control window 3 and then enter an instruction to change the display position of the item (here, reception of the first channel), then the control section 33 of the audio-visual monitor unit 21 reads out data of access to the first channel stored in the access data memory 33d and calculates the frequency of accessing to it for a predetermined period of time (steps S101 and S102 shown in FIG. 12). Subsequently, the control section 33 calculates the accessing frequencies to the other items (here, the sixth channel and the first and second programs of broadcasting via satellite) (step S103). Then, the control section 33 compares the accessing frequencies thus calculated and judges whether or not the display position of the item indicative of reception of the first channel should be changed (step S104), and if it judges that the display position should be changed, then it controls the display section 38 to change the display position of the item (step S105).

Here, while the judgment whether or not the display position of the item should be changed may depend only upon the accessing frequency, if the relationship between the time and the accessing frequency is detected and the future accessing frequency is forecast using the relationship to make a judgment, then an item which is easier to use can be displayed.

Figure 13:
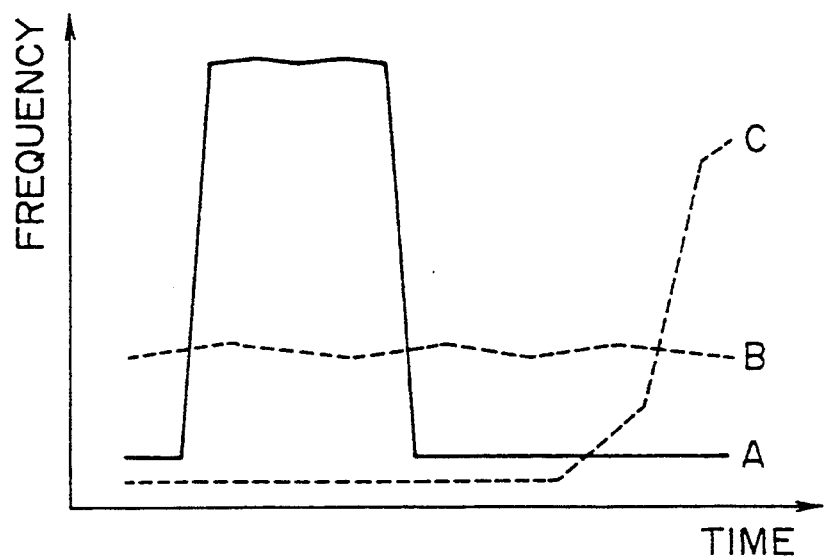
FIG. 13 is a diagram illustrating access data handled in the monitor apparatus of the second embodiment with respect to time.

For example, the curve A shown in FIG. 13 indicates data of access to a seasonal program such as relay broadcasting of sports with respect to time. It can be seen that the accessing frequency is very high only within a particular time or season. Meanwhile, the curve B in FIG. 13 indicates data of access to a news program or the like and exhibits constant accessing. Further, the curve C in FIG. 13 indicates data of access, for example, to a drama which has been started last October, and it exhibits the tendency in which the accessing frequency has increased recently. In such an instance, the programs should be set such that the program of the news (for example, the first channel, which is watched constantly, is set to the uppermost position, and the dram a (for example, the sixth channel) is set to the second uppermost position while the sport program (for example, the fourth channel) which has not been watched recently is set to the third uppermost position. Further, if the control section 33 is provided with a learning function so that the item of a reception program or a reproduction program which is enjoyed periodically every week is shifted to the top or an upper position of the menu when the time comes, then the menu becomes further easy to use.

It is to be noted that, while, in the present embodiment, the present invention is applied to an audio-visual system wherein an audio-visual monitor unit is connected to several audio-visual units by way of audio-visual buses which transmit a command signal, a video signal and an audio signal, the present invention can also be applied to an audio-visual system wherein a command signal, a video signal and an audio signal are transmitted by way of separate cables or which consists of a television receiver by itself.

Further, while the access data memory is provided in the control section of the audio-visual monitor unit in the present embodiment, access data memories may be provided individually in the control sections of the audio-visual units corresponding to items of programs so that access data may be stored in the access data memories (in particular, access data for a reception program are stored in the access data memory of the control section of the tuner, and access data for a reproduction program of the video tape recorder are stored in the access data memory of the control section of the video tape recorder) and selectively transferred to the audio-visual monitor unit by way of the audio-visual buses upon initial setting of a menu or upon instruction of changing of the menu position.

Subsequently, a monitor apparatus for an audio-visual system according to a third preferred embodiment of the present invention will be described. Also the monitor apparatus of the present embodiment is incorporated in the audio-visual system shown in FIG. 5 and has such hardware construction as shown in FIG. 7 similarly as in the first and second embodiments described hereinabove, and overlapping description of them is omitted herein to avoid redundancy. The monitor apparatus of the present embodiment is different from the monitor apparatus of the preceding embodiments only in that the control program stored in the ROM 33b of the control section 33 of the audio-visual monitor unit 21 is different and accordingly the monitor apparatus of the present embodiment operates in a different manner. Thus, operation of the monitor apparatus of the present embodiment will be described subsequently with reference to FIGS. 5 to 7 and 15 to 17. In particular, operation of the monitor apparatus when the user wants to reproduce and display a program of the video tape recorder 22 on the audio-visual monitor unit 21 will be described below by way of example.

Figure 17:
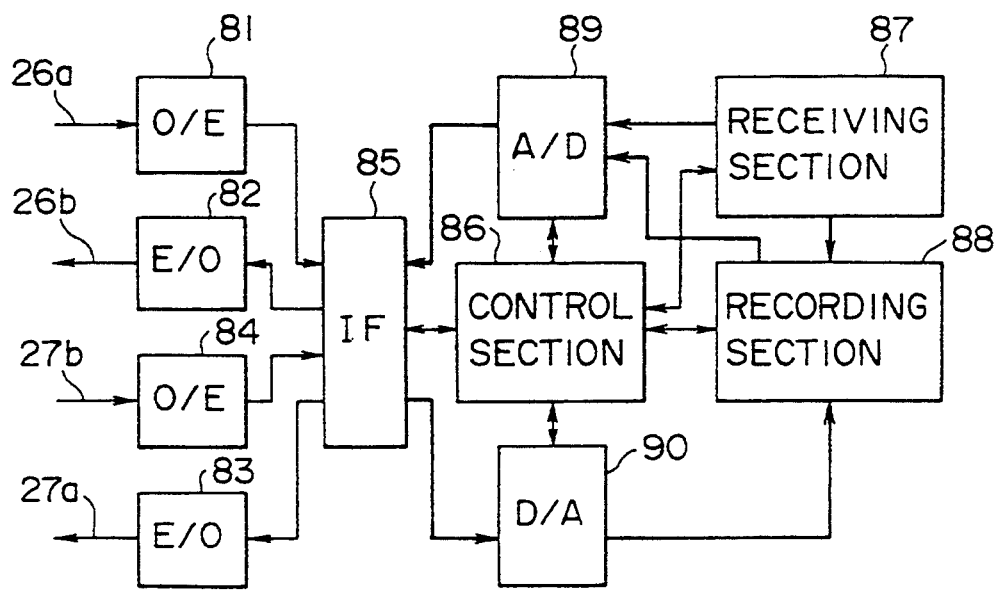
FIG. 17 is a block diagram showing the general construction of a video tape recorder constituting the audio-visual system shown in FIG. 5.

Referring first to FIGS. 5, 7 and 17, the construction of the video tape recorder 22 of the audio-visual system is shown. Also in FIG. 17, transmission lines only for a video signal and an audio signal are each indicated by a thick line similarly as in FIGS. 7, 8 and 14.

The video tape recorder 22 includes a photoelectric converter (O/E) 81 which converts an optical signal inputted thereto through the audio-visual bus 25a into an electric signal, and an interface (IF) 85 which transfers the electric signal to a control section 86 which may be constituted from a microcomputer. The control section 86 fetches data inputted thereto by way of the interface 85 if the destination address added to the data is for the control section 86 itself, and analyzes and executes the command included in the data. But, if the destination address of the data inputted to the control section 86 is not for the control section 86 itself, the control section 86 does not fetch the data. Data which have not been fetched by the control section 86 are converted into an optical signal by an electro-optic converter (E/O) 83 and are sent out to the audio-visual bus 26a. A receiving section 87 receives television broadcasting of a predetermined channel based on the command analyzed by the control section 86, and a recording section 88 records or reproduces a television broadcasting signal received by the receiving section 87 based on the command analyzed by the control section 86 or a video signal and an audio signal of the laser disk player 23 or the camcorder 24 inputted thereto by way of the audio-visual bus 25a. An analog to digital (A/D) converter 89 converts a video signal and an audio signal outputted from the receiving section 87 or the recording section 88 into digital signals and sends them out to the interface 85. A digital to analog converter (D/A) 90 converts a video signal and an analog signal outputted from the camcorder 84 or any other audio-visual unit and inputted thereto from the audio-visual bus 25a into analog signals and sends them out to the recording section 88.

Now, operation of the monitor apparatus of the present embodiment when broadcasting of the sixth channel is received by the receiving section 87 of the video tape recorder 22 and displayed on the audio-visual monitor unit 21 will be described with reference to FIGS. 5 to 7 and 15 to 17.

Figure 15:
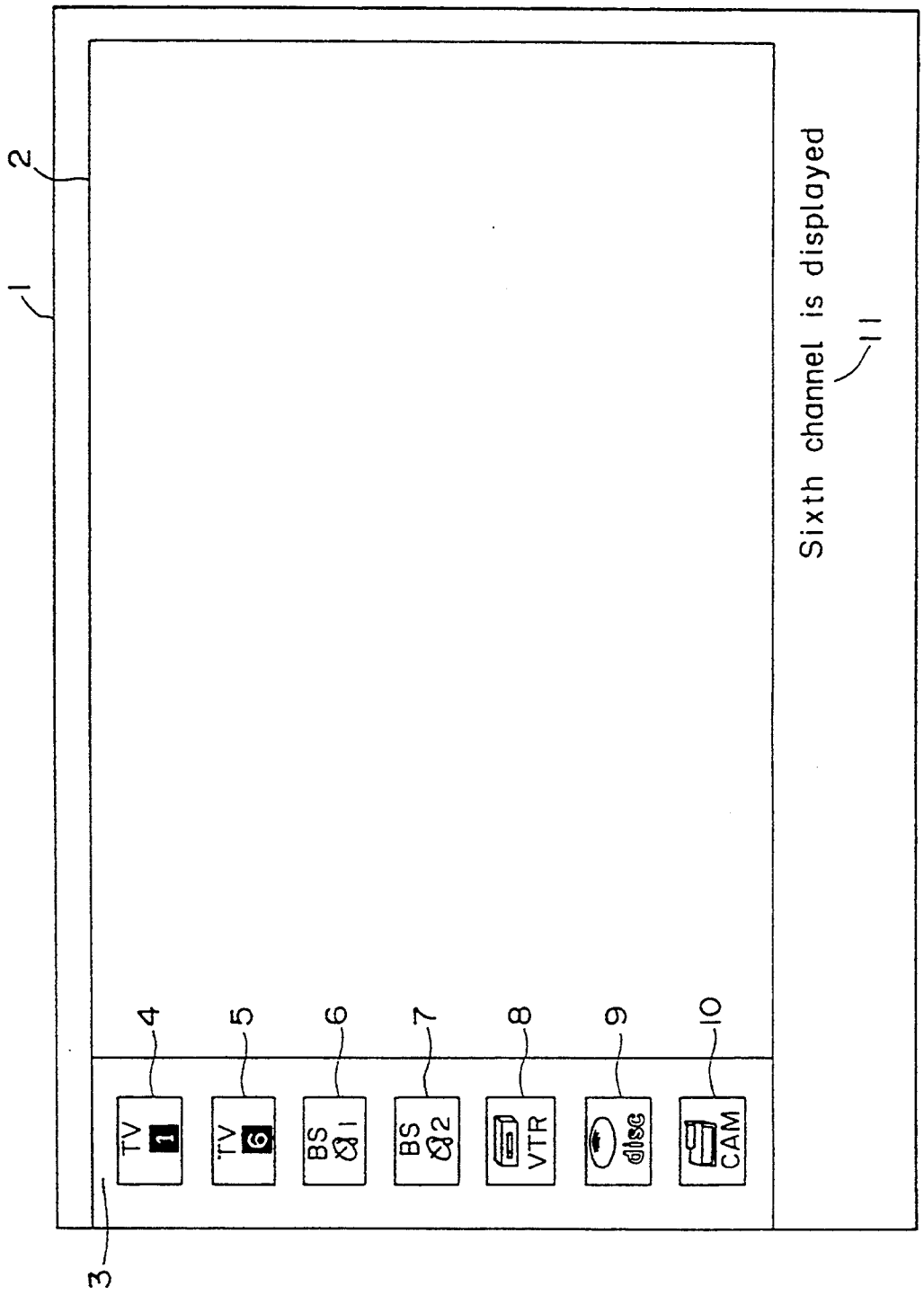
FIG. 15 is a diagrammatic view showing the display screen displayed with a monitor apparatus according to a third preferred embodiment of the present invention.
Figure 16:
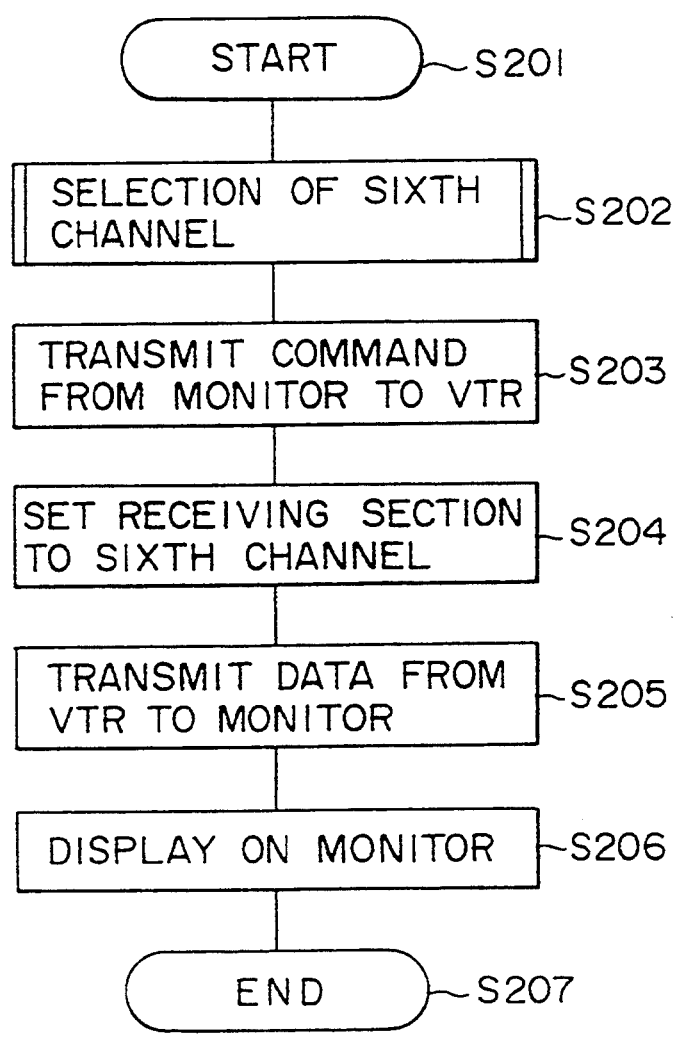
FIG. 16 is a flow chart illustrating operation of of the monitor apparatus of the third embodiment upon manual operation of the remote controlling and pointing device.

After the user turns on the power source on/off switch 52 of the remote controlling and pointing device, the user will manually turn on the menu on/off switch 53 of the remote controlling and pointing device in order to display a control menu on the display section 38 of the audio-visual monitor unit 21 (step S201 in FIG. 16). Consequently, the control section 33 of the audio-visual monitor unit 21 analyzes the command and causes the display section 38 to display a first control window 3 at the left end of the display screen 1 of the display section 38 and simultaneously causes the display section 38 to display icons 4 to 10 indicating different programs in the first control window 3 as seen in FIG. 15, in a similar manner as shown in FIGS. 1 and 11. Here, the icons 4 to 10 are similar to those shown in FIG. 1.

Subsequently, the user will manually operate the click button/track ball 54 of the remote controlling and pointing device to select the icon 5 and click it (step S202). The control section 33 of the audio-visual monitor unit 21 thus analyzes a command inputted thereto by way of the infrared-ray to electricity converter 31 and the interface 32. Then, the control section 33 produces a command to set the receiving section 87 of the video tape recorder 22 to the sixth channel and forward a signal of the received sixth channel to the audio-visual monitor unit 21, adds to the command a control bit set which represents that the source address indicates the audio-visual monitor unit 21 and the destination address indicates the video tape recorder 22, and sends out the resulting signal into the audio-visual bus 25a by way of the interface 34 and the electro-optic converter 35 (step S203).

The control section 86 of the video tape recorder 22 fetches the data, checking the destination address added to the data inputted thereto, and analyzes the command. Then, the control section 86 sets the reproducing section 87 to the sixth channel to effect reception of the broadcasting (step S204).

Further, the control section 86 adds, to reception signals converted into digital signals by the analog to digital converter 89, a control bit set which represents that the source address indicates the video tape recorder 22 and the destination address indicates the audio-visual monitor unit 21, and sends out the resulting signal into the audio-visual bus 27a by way of the interface 85 and the electro-optical converter 83 (step S205). The data sent out into the audio-visual bus 27a come to the audio-visual monitor unit 21 by way of the tuner 23, the audio-visual bus 28a, the laser disk player 24, the audio-visual bus 29a, the camcorder 25, the audio-visual bus 29b, the laser disk player 24, the audio-visual bus 28b, the tuner 23, the audio-visual bus 27b, the video tape recorder 22 and the audio-visual bus 26b.

The control section 33 of the audio-visual monitor unit 21 fetches the data, checking the destination address added to the data inputted thereto from the audio-visual bus 26b. The digital to analog converter 37 converts the data inputted thereto into analog signals and outputs them to the display section 38. Consequently, the image of the sixth channel is displayed in the major area 2 of the screen 1, and a message 11 "The sixth channel is displayed" is displayed in the area below the major area 2 (step S206). In this instance, while the icons 3 to 9 may continue to be displayed, if the menu on/off switch 53 of the remote controlling and pointing device is turned off to erase them, then the area in which the image of the sixth channel is displayed can be increased.

The selecting operation of the sixth channel is completed with this (step S207).

It is to be noted that a plurality of video tape recorders may be provided in the present embodiment so that a broadcast received by an arbitrary one of them may be supplied to the audio-visual monitor unit 21. Further, the tuner 23 for exclusive use may be omitted.

It is to be noted that the present invention is not limited to the embodiments described above and various modifications are possible based on the subject matter of the present invention, and they are not excluded from the scope of the present invention. For example, a printing apparatus such as a video printer, a unit which outputs only an audio signal such as a compact disk (CD) player and a digital audio tape player (DAT), and a multi-media unit such as a CD-I (compact disk interactive) player or a DVI player may be provided for the audio-visual buses.

Figure 18:
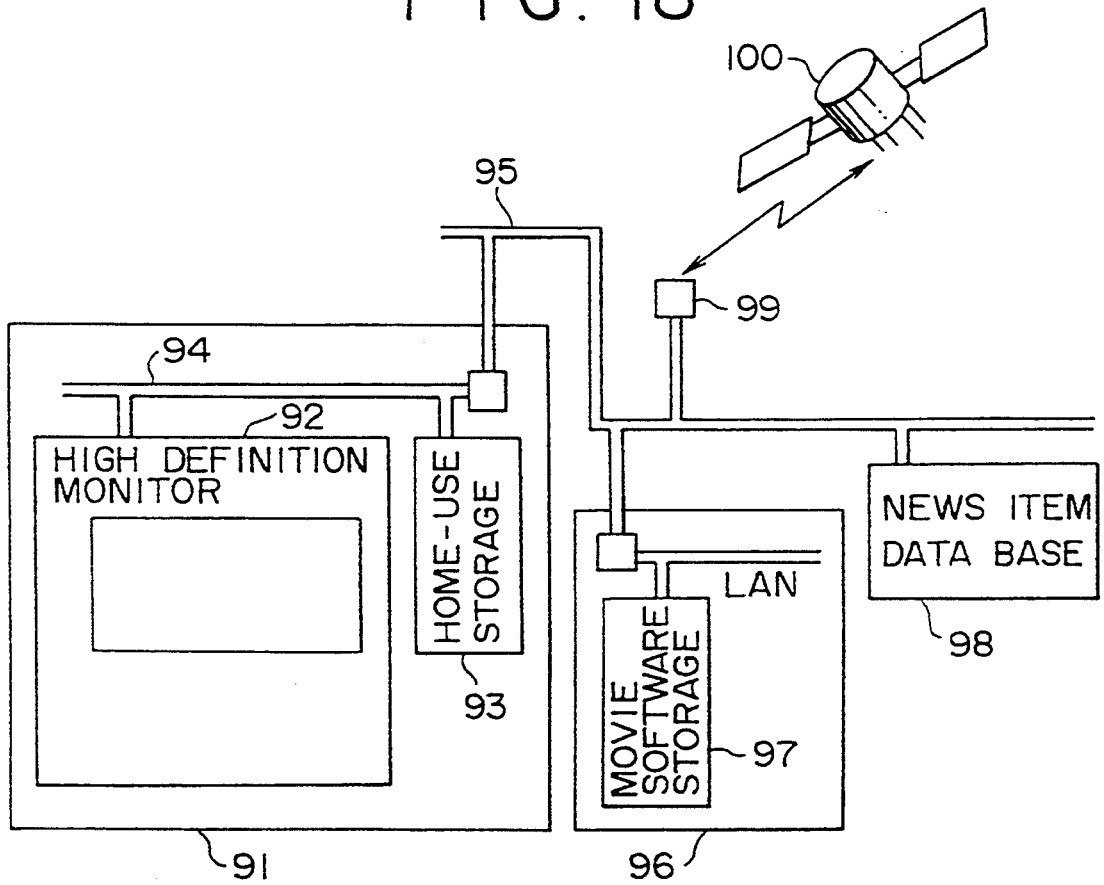
FIG. 18 is a block diagram of the general construction of another audio-visual system in which a monitor apparatus according to a fourth preferred embodiment of the present invention is incorporated.

Referring now to FIG. 18, there is shown a different audio-visual system in which a monitor apparatus according to a fourth preferred embodiment of the present invention is incorporated. The audio-visual system shown includes a high definition monitor unit 92 and a home-use storage 93 installed in a home 94 in general and connected by way of a home audio-visual bus 94 to a high speed large capacity digital network 95 such as the B-ISDN.

The home-use storage 93 is a storage device constituted from a hard disk drive unit or a magneto-optic disk drive unit and having the storage capacity of several gigabits and stores therein movie information inputted thereto from a movie software storage 97 of a movie distribution agency 96 or a news item inputted thereto from a news item data base of a newspaper company 98, or various programs of foreign countries inputted thereto from a communication satellite 100 by way of a satellite communication gateway 99, by way of the high speed large capacity digital communication network 95.

In the present audio-visual system, the format of a signal passing the home audio-visual bus 94 may be the same as that in the audio-visual system of FIG. 5. Further, the connection configuration between the high definition monitor unit 92 and the home audio-visual bus 94 is similar to that of the audio-visual system of FIG. 5.

Figure 19:
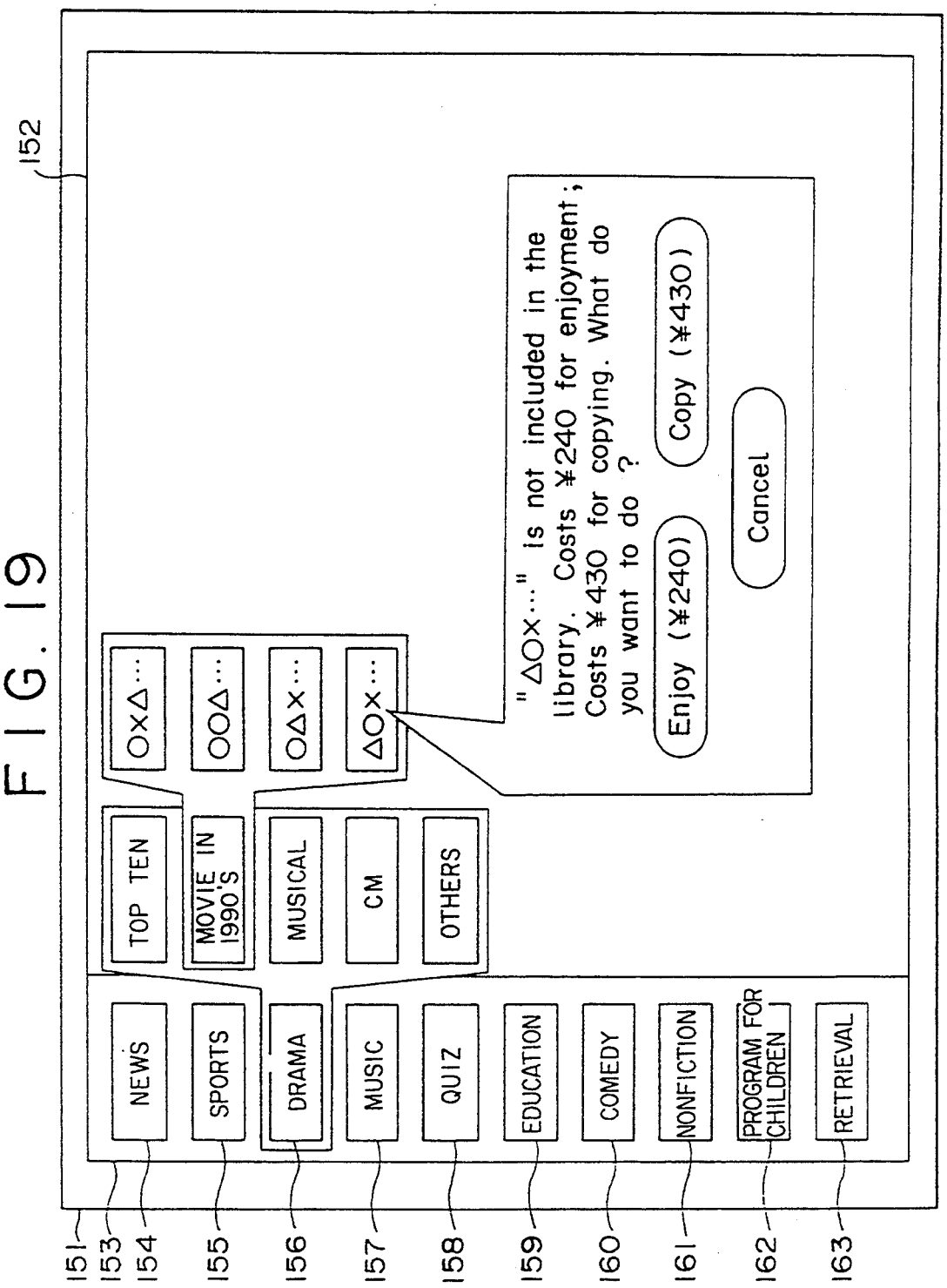
FIG. 19 is a diagrammatic view showing the display screen of the monitor apparatus of the fourth embodiment on which a menu is displayed.
Figure 20:
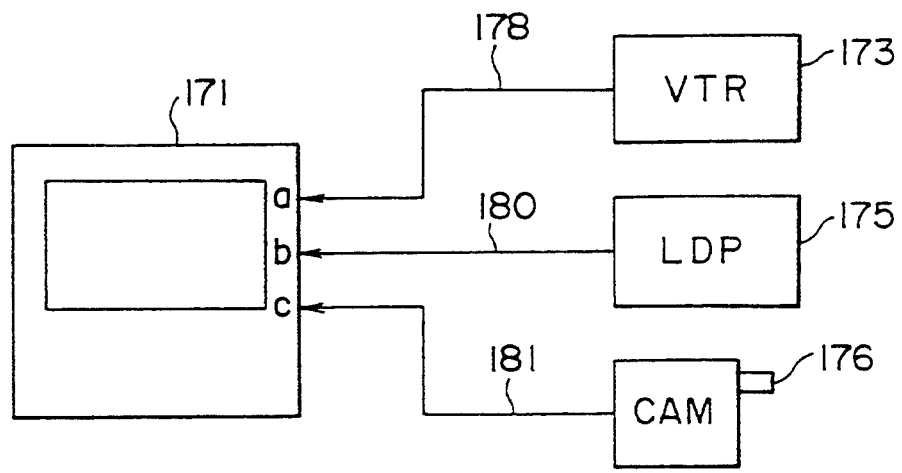
FIG. 20 is a block diagram showing the general construction of a conventional audio-visual system.
Figure 21:
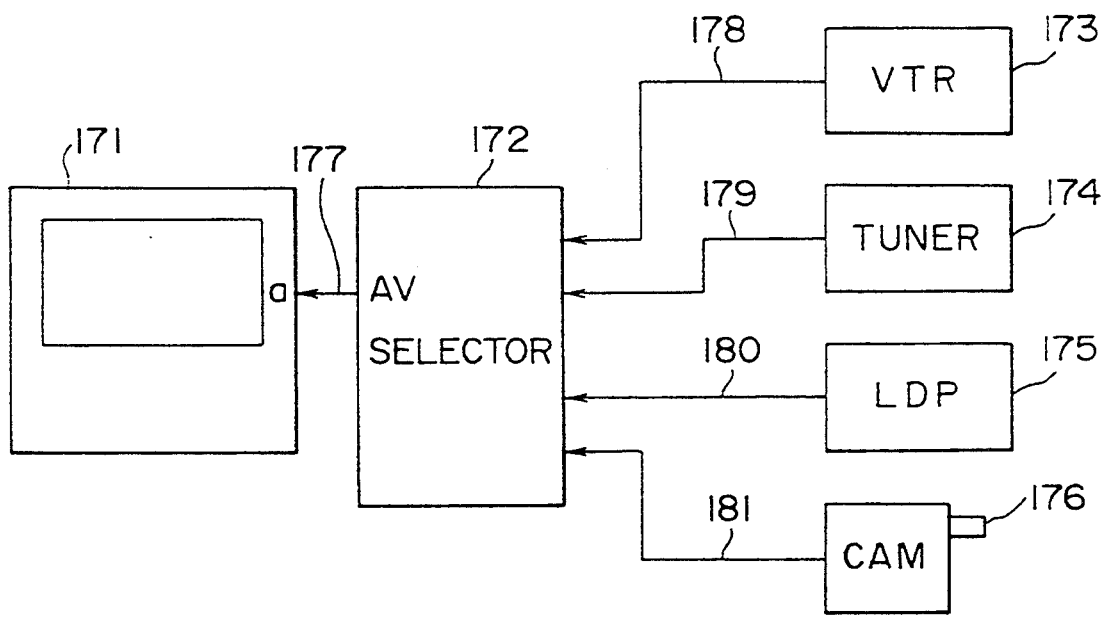
FIG. 21 is a block diagram showing the general construction of another conventional audio-visual system.
Figure 22:
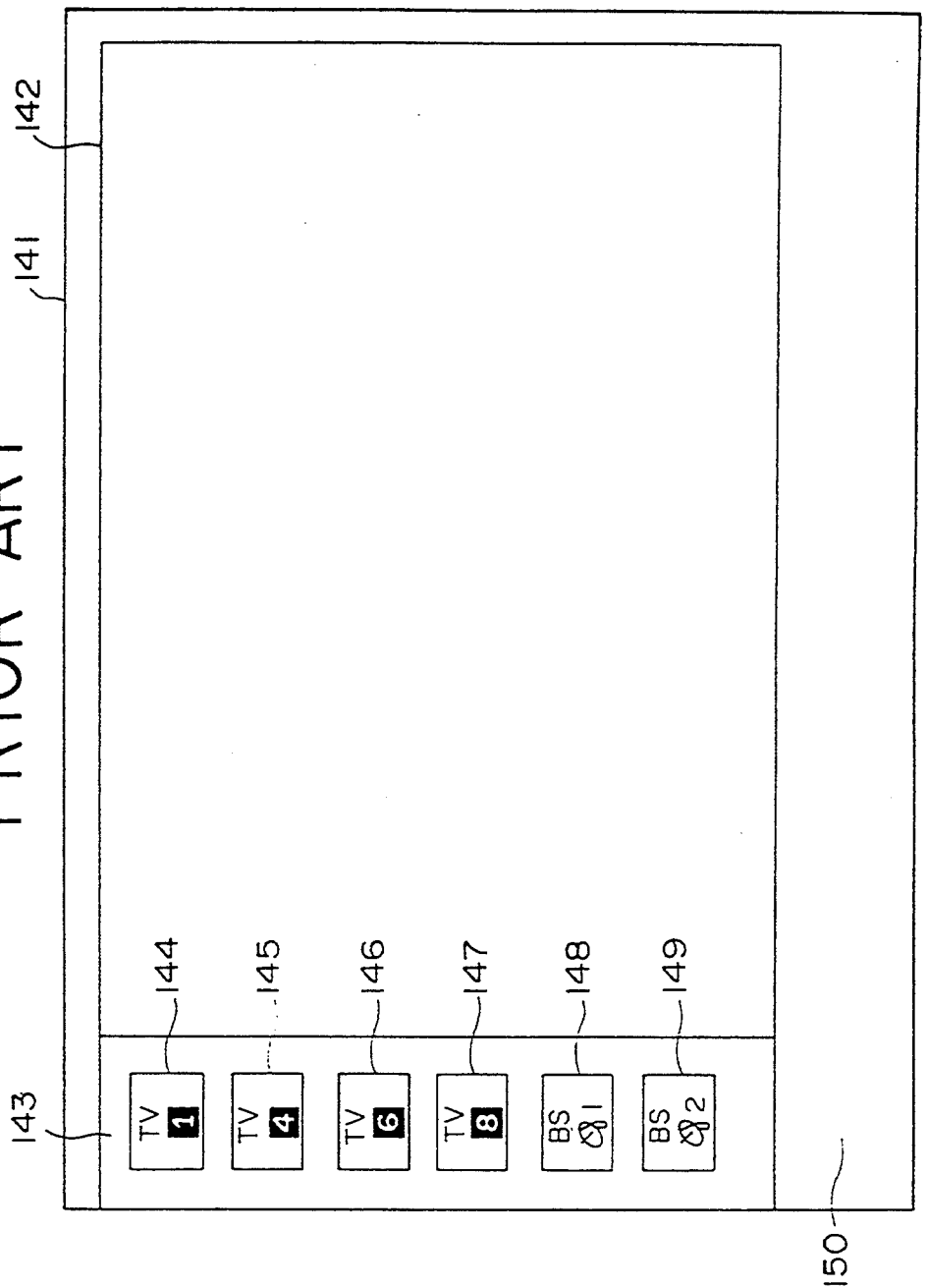
FIG. 22 is a diagrammatic view showing a conventional display screen on which a control menu is displayed.

A still further monitor apparatus according to the present invention is incorporated in the audio-visual system shown in FIG. 18. FIG. 19 shows a menu display screen which may be used in the monitor apparatus of the present embodiment.

In the present embodiment, the necessity for such selection of an audio-visual unit as in the preceding embodiments is eliminated, and the user is only required to select one of menu items 15 to 162 of programs displayed in a control window 152 at the left end of a display screen 151 separately for different categories such as a news, sport, a drama, . . . and a program for children. Further, if an additional menu item 163 is selected, then a program is searched and selected in accordance with the title or the name of the director of a movie. Programs which are enjoyed comparatively frequently are displayed at upper portions of the menu display screen. Alternatively, a particular program (a news at seven o'clock) may be displayed at an upper portion of the menu display screen.

In the present embodiment, if the user selects a program, then a control section not shown in the high definition monitor unit 92 controls so that it either accesses the home-use storage 93 by way of the home audio-visual bus 94 or accesses the movie software storage 97 or the like by way of the high speed large capacity digital communication network 95 so that the selected program may be inputted to the high definition monitor unit 92.

For example, if a drama is selected, then the control window 156 is opened and control windows for "top ten", "movies in the 1990's" and so forth come out. If the "movies in the 1990's" is selected in this condition, then a control window in which several titles "XXX . . . " of specific movies are displayed come out. Here, if, for example, the "Δx . . . " is selected, then the control section of the high definition monitor unit 92 first accesses the home-use storage 93, and if the movie is not stored in the home-use storage 93, then the control section of the high definition monitor unit 92 accesses the movie software storage 97 of the movie distribution agency 96. Then, the control section causes the display screen 151 to display a message for selection whether the movie is to be enjoyed or copied or of cancellation. In this instance, if the user selects to enjoy or copy the movie, the movie is displayed in the region 152 of the display screen 151 of the high definition monitor unit 92 in accordance with contents thus selected and is stored into the home-use storage 93. On the other hand, if the cancellation is selected, then the display returns to the screen of the control window in which the titles of the movies are displayed.

Having now fully described the invention, it will be apparent to one of ordinary skill in the art that many changes and modifications can be made thereto without departing from the spirit and scope of the invention as set forth herein.

What is claimed is:

1. A monitor apparatus for an audio-visual system which includes a monitor unit, a plurality of audio-visual units, and audio-visual bus means for transmitting data signals including a command, a video signal and an audio signal between said monitor unit and said audio-visual units, said monitor apparatus comprising:

display means for displaying thereon a first control window including a plurality of icons representing respectively said plurality of audio-visual units and a second control window for displaying a plurality of control keys corresponding respectively to a plurality of operation modes of the plurality of audio-visual units, and for displaying images produced by said audio-visual units in a third window;

pointing means for operation by a user of the monitor apparatus a moving a pointer on said first control window and on said second control window for selecting one of said plurality of icons in said first control window and for selecting one of said plurality of control keys in said second control window; and controlling means for causing, when one of said plurality of icons displayed in said first control window is selected by said pointing means, said display means to display available operation modes of the corresponding audio-visual unit and for putting, when one of the control keys is selected by said pointing means, the selected audio-visual unit into the selected operation mode.

2. A monitor apparatus for an audio-visual system according to claim 1 wherein said pointing means includes a plurality of remote control keys provided on a remote controller for said monitor unit.

3. A control menu displaying apparatus for displaying a control menu for selecting a program to be displayed on a display unit, said control menu displaying apparatus comprising:

first means for causing said display unit to display thereon a control menu including several items of programs;

second means for designating selected ones of said several items of programs for display;

third means for storing therein access data corresponding to the selected ones of the several items of programs;

fourth means for developing an instruction to change the display position of a designated one of the items in the control menu based on comparing the access data to the designated item with the access data to the other items and determining whether the designated item has been designated a greater number of times than the other items; and fifth means responsive to the instruction from said fourth means for changing the display position of the designated item within the control menu displayed on the display unit.

4. A control menu displaying apparatus according to claim 3 wherein the items are displayed in a vertical column, and when said fourth means determines that the display position of the designated item should be changed, said fifth means shifts the display position of the designated item upwardly in the vertical column.

* * * * *

UNITED STATES PATENT AND TRADEMARK OFFICE
CERTIFICATE OF CORRECTION

PATENT NO. : 5,371,553
DATED : December 6, 1994
INVENTOR(S) : Harumi Kawamura and Kazuyuki Ogawa It is certified that error appears in the above-indentified patent and that said Letters Patent is hereby corrected as shown below:

On the title page, item [57], line 10, "pointed by a selected" to --selected by a pointing -- line 14, after "device" insert --,--
Col. 11, line 7, delete "visual" second occurrence
Col. 15, line 9, change "dram a" to --drama--
Col. 18, line 56, change "$\Delta x$" to --$\Delta ox$--

Col. 19, line 26, change "a" first occurrence to --and--

Signed and Sealed this

Thirty-first Day of October 1995

Attest:

BRUCE LEHMAN

*Attesting Officer*      *Commissioner of Patents and Trademarks*